(12) United States Patent
Tsuboi et al.

(10) Patent No.: US 6,702,483 B2
(45) Date of Patent: Mar. 9, 2004

(54) OPTICAL ELEMENT

(75) Inventors: Takayuki Tsuboi, Yokohama (JP); Ichiro Onuki, Kawasaki (JP); Goro Noto, Tokyo (JP); Eriko Kawanami, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/783,072

(22) Filed: Feb. 15, 2001

(65) Prior Publication Data

US 2001/0017985 A1 Aug. 30, 2001

(30) Foreign Application Priority Data

Feb. 17, 2000 (JP) .................................. 2000-040147
Mar. 3, 2000 (JP) .................................. 2000-058285

(51) Int. Cl.[7] .............................. G03B 9/08; G03B 9/02; G02F 1/00; G02B 26/00
(52) U.S. Cl. ................... 396/449; 396/457; 396/460; 396/506; 359/245; 359/291; 359/666
(58) Field of Search ................... 396/505, 506, 396/509, 249, 260, 457, 449, 452, 460, 462, 458, 72; 359/228, 665, 666, 290, 291, 245; 349/200, 193, 33, 46, 47, 151, 183

(56) References Cited

U.S. PATENT DOCUMENTS 5,687,401 A * 11/1997 Kawamura et al. ........... 396/79

5,745,255 A    4/1998  Yamaguchi .................. 358/426
6,369,954 B1 * 4/2002  Berge et al. ................. 359/666
6,449,081 B1 * 9/2002  Onuki et al. ................. 359/245

FOREIGN PATENT DOCUMENTS

| JP | 7-5497 | 1/1995 |
| JP | 7-128635 | 5/1995 |
| JP | 9-15681 | 1/1997 |
| JP | 9-236740 | 9/1997 |
| JP | 3-87816 | 9/2000 |
| WO | WO 99/18456 | 4/1999 |

* cited by examiner

*Primary Examiner*—Russell Adams
*Assistant Examiner*—Rochelle Blackman
(74) *Attorney, Agent, or Firm*—Fitzpatrick, Cella, Harper & Scinto

(57) ABSTRACT

An optical device capable of controlling its optical transmittance. The optical device has a first liquid conductive or having a polarity and a second liquid. The first and second liquids are substantially equal in refractive index but differ in transmittance. The first and second liquids do not mix with each other. The first and second liquids are sealingly contained in a container in such state that the boundary therebetween has a predetermined shape. When a voltage is applied between these liquids through electrodes formed in such a place or condition as to avoid interference with passage of a bundle of rays incident upon the optical element, the output of the applied voltage is selected under control to change the shape of the boundary, thereby changing the quantity of transmitted light in the bundle of rays traveling through the optical device.

25 Claims, 19 Drawing Sheets

FIG. 7A
FIG. 7B
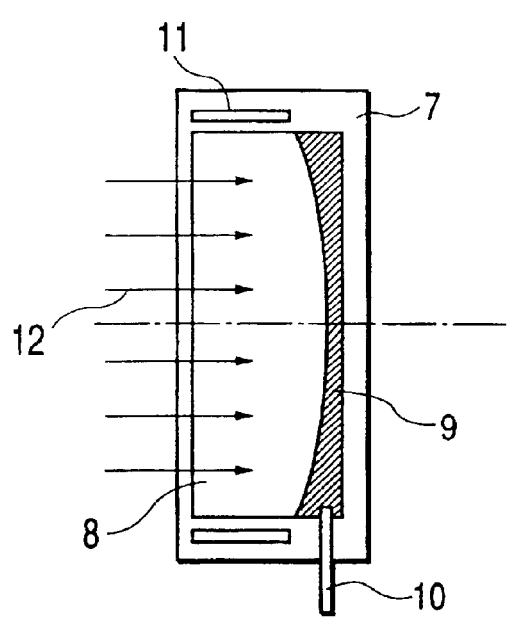
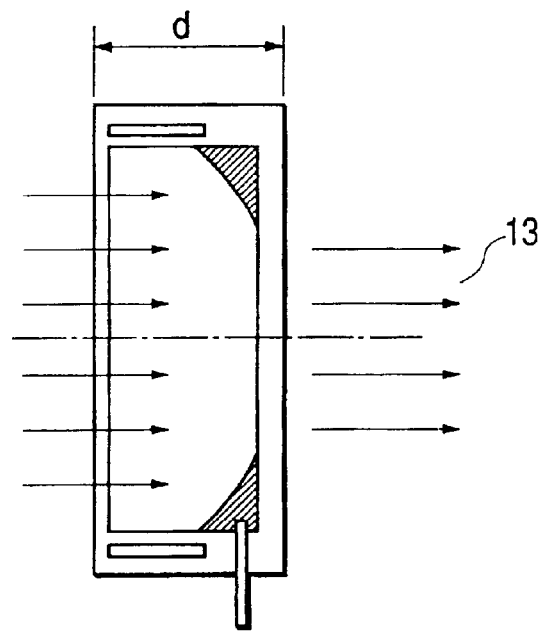

WAVE FORM B

WAVE FORM A

FIG. 19
|  | f=20mm | f=15mm | f=12mm | f=10mm |
|---|---|---|---|---|
| -5 °C | 30V | 145V | 166V | 218V |
| 0 °C | 28V | 142V | 163V | 214V |
| 10 °C | 25V | 140V | 160V | 210V |
| 20 °C | 22V | 137V | 158V | 207V |
| 30 °C | 20V | 133V | 154V | 203V |
| 40 °C | 18V | 130V | 151V | 198V |
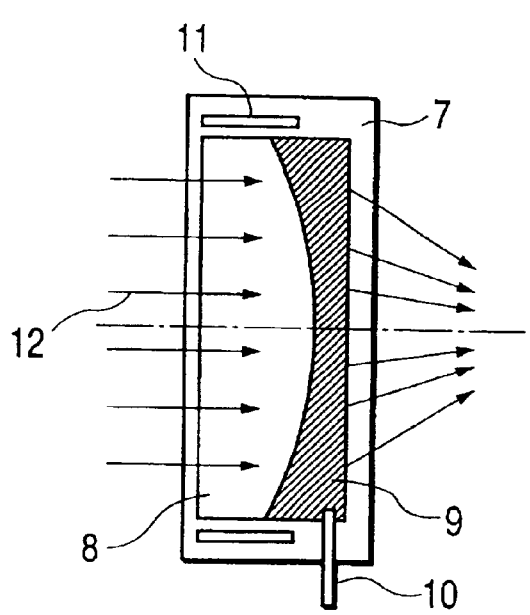
FIG. 20A
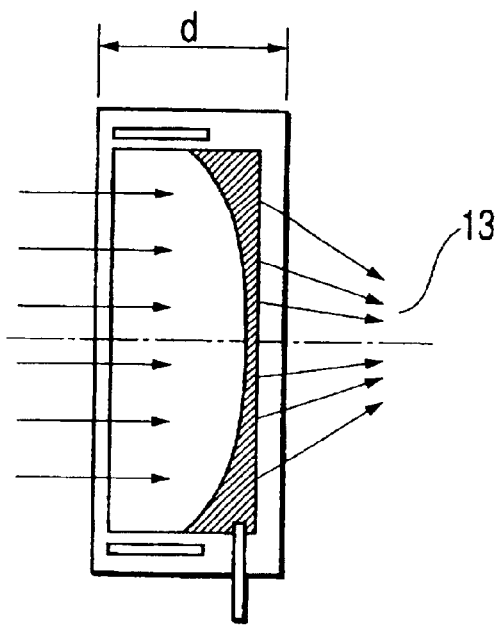
FIG. 20B

OPTICAL ELEMENT

BACKGROUND OF THE INVENTION

1. Field of the Invention

The present invention relates to an optical element for controlling the amount of light transmitted as a ray bundle through an optical system, i.e., an optical filter, and to a photo-taking device using the optical element. More particularly, the present invention aims to realize an optical element which can be designed so as to be smaller in size, capable of efficiently controlling the amount of transmitted light by simple construction, and which is suitable for forming a variable neutral density filter (variable ND filter), an apodization filter, a filter for correcting a reduction of marginal light, etc., an optical system formed by a lens unit incorporating an aperture or shutter constituted by the optical element, and a photo-taking device using such an optical system.

2. Related Background Art

Conventionally, photo-taking optical systems for use in photo-taking devices such as still and video cameras need to have a focusing function, a light quantity control function, a function for a natural softfocus effect, a function for uniformly distributing a quantity of light at the image plane, etc.

For the light quantity control function in these functions, a mechanical aperture formed of a plurality of movable blades is generally used.

Such a mechanical diaphragm, however, necessitates a mechanical driving system, which increases the overall size of a device incorporating the mechanical aperture and the drive. Also, such a mechanical diaphragm has the problem of diffraction of rays under a small-aperture condition causing a reduction in the resolution of a formed image.

To avoid such a problem, a variable transmittance element using a liquid crystal material or an electrochromic material, i.e., a variable ND (Neutral Density) filter, has been proposed.

For example, Japanese Patent Application Laid-open No. 3-87816 discloses an electrochromic optical modulator designed so as to prevent a non-uniformity of color of transmitted light.

Japanese Patent Application Laid-open No. 7-5497 discloses a technique for realizing a variable ND filter by enabling silver in a solution to precipitate and dissolve freely.

Japanese Patent Application Laid-open No. 7-128635 discloses a technique for adjusting the quantity of light entering a photoelectric converter by using a liquid crystal filter that has variable density.

Japanese Patent Application Laid-open No. 9-236740 discloses, as a technique for realizing a natural softfocus effect a technique relative to an apodization filter formed by combining a planoconcave lens having a large light absorption coefficient with a planoconvex lens having a small light absorption coefficient.

As a technique for correction of marginal light quantity reduction on the imaging plane Japanese Patent Application Laid-open No. 9-15681 discloses a light quantity adjustment technique using a liquid crystal variable ND filter having a higher density at its center and capable of density control.

Further, WO99/18456 discloses a variable-focus lens based on electrocapillarity (electrowetting phenomenon). If this art is used, electrical energy can be directly used for changing the shape of a lens, thereby enabling focus control without any mechanical lens movement.

SUMMARY OF THE INVENTION

One aspect of the application the present invention relates to an object for providing an optical device comprising as an optical element a container and first and second liquids sealingly or hermetically contained in the container, the first and second liquids being substantially equal in refractive index, the first and second liquids existing without mixing with each other, the first and second liquids differing from each other in transmittance, the first and second liquids being sealingly contained in the container with the boundary between the first and second liquids having a predetermined shape, and an electrode formed in such a place as to avoid interference with passage of a bundle of rays incident into the optical element, wherein a voltage is applied to the electrode to change the transmittance with respect to the bundle of rays.

Another aspect of the application of the present invention relates to an object for providing an optical device comprising an optical element having a container having a side surface inclined at a predetermined angle from an optical axis, and first and second liquids contained sealingly or hermetically in the container, the first and second liquids differing substantially from each other in transmittance, the first and second liquids existing without mixing with each other, the first and second liquids being contained in the container with the boundary between the first and second liquids having a rounded shape, and an electrode formed in such a place as to avoid interference with passage of a bundle of rays incident into the optical element, wherein a voltage is applied to the electrode to change the refractive index of the optical element.

Another aspect of the application of the present invention relates to an object for providing an optical device comprising a lens element and at least one of a diaphragm and a shutter incorporated in the lens element.

These and other objects, features and advantages of the present invention will become apparent from the detailed description of embodiments of the invention taken in conjunction with the accompanying drawings.

BRIEF DESCRIPTION OF THE DRAWINGS

FIG. 3A shows a state when the output voltage applied to the optical element is zero or extremely low;

FIG. 3B shows a state when the output voltage is higher than that in case shown in FIG. 3A;

FIG. 3C shows a state when the output voltage is higher than that in case shown in FIG. 3B;

FIGS. 7A and 7B are diagrams showing the construction of an optical device for use in an optical system in first embodiment of the present invention;

FIG. 19 is a diagram showing a table which may be provided in the CPU at the time of the temperature correction operation shown in FIGS. 18A to 18D;

FIGS. 20A and 20B are diagrams showing the principle of the construction of optical element in fourth embodiment of the present invention;

DESCRIPTION OF THE PREFERRED EMBODIMENTS

The construction and principle of an optical element of the present invention will first be described with reference to FIG. 1.

Figure 1:
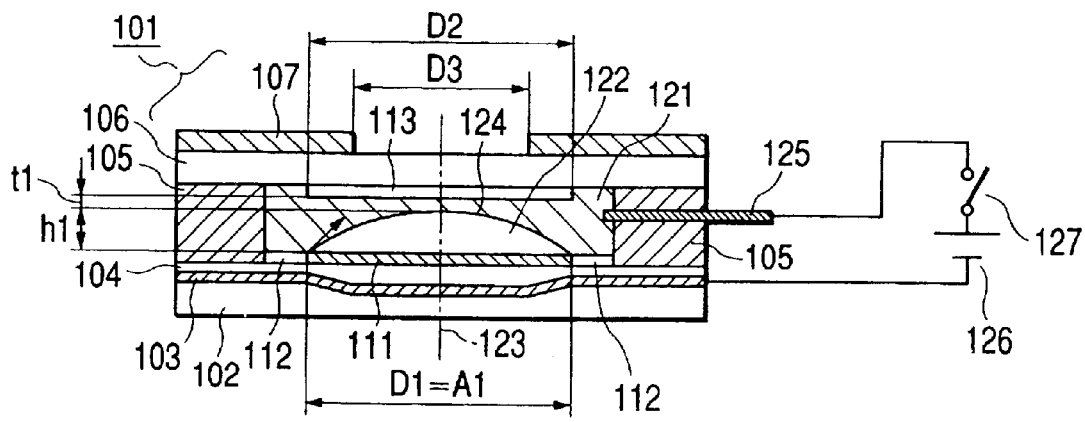
FIG. 1 is a diagram for explaining the construction and principle of an optical element to enable control of the quantity of transmitted light by utilizing electrocapillarity (electrowetting phenomenon)

Referring to FIG. 1, an optical element has its entire body indicated by 101. A transparent substrate made of a transparent acrylic resin and having a recess at its center is indicated by 102. A transparent electrode 103 made of indium tin oxide (ITO) is formed on the upper surface of the substrate 102 by sputtering, and an insulating layer 104 formed of a transparent acrylic resin is provided in closely contact with the upper surface of the transparent electrode 103. The insulating layer 104 is formed by dropping a replica resin to central portion of the transparent electrode 103, pressing the resin with a glass plate so that the surface of the resin becomes flat, and thereafter irradiating ultraviolet rays to the resin to cure the resin. A cylindrical container 105 having a light shielding effect is bonded and fixed to the upper surface of the insulating layer 104, a cover plate 106 made of a transparent acrylic resin is bonded and fixed to the upper surface of the cylindrical container 105, and a diaphragm plate 107 with an aperture formed at its center and having a diameter of D3 is placed on the cover plate 106. In the thus-constructed optical element, an enclosed housing surrounded by the insulating layer 104, the container 105 and the upper cover 106 and having a predetermined volume is formed, that is, a case having a liquid chamber is formed. The wall surfaces of the liquid chamber are subjected to a surface process as described below.

A material for forming a water repellent surface is applied to the upper surface portion of the insulating layer 104 at a center of and within an area having a diameter D1, thereby forming a water repellent film 111. The material for forming a water repellent surface is, preferably, a fluoride or the like. Also, a material for forming a hydrophilic surface is applied to the upper surface portion of the insulating layer 104 outside the area of diameter D1 thereby forming a hydrophilic film 112. The material for forming the hydrophilic surface is, preferably, a surfactant, a hydrophilic polymer, or the like. On the other hand, at the lower surface of the cover plate 106, hydrophilic process is applied within the range of diameter D2, and hydrophilic film 113 having the same quality of the hydrophilic film 112 is formed. Each of all the above-described components is formed so as to have a rotational symmetry about an optical axis 123.

A hole is formed in a portion of the container 105, and a rod electrode 125 is inserted in this hole and fixed by an adhesive which seals the gap between the electrode 125 and the container 105 to hermetically maintain the above-mentioned liquid chamber. A power supply means 126 is connected to the rod electrode 125 and the transparent electrode 103, and a predetermined voltage can be applied between the two electrodes by operating a switch 127.

The liquid chamber formed as described above is filled with two kinds of liquid described below. First, a predetermined amount of a second liquid 122 is dropped onto the repellent film 111 on the insulating layer 104. As second liquid 122, colorless transparent silicone oil having a specific gravity of 0.85 and a refractive index of 1.38 at room temperature is used.

The remaining space of the liquid chamber is filled with a first liquid 121. The first liquid 121 is an electrolyte having a specific gravity of 0.85 and a refractive index of 1.38 at room temperature. This electrolyte is prepared by mixing water and ethyl alcohol in predetermined proportions and by adding a predetermined amount of electrolyte, for example sodium chloride, to the mixture of water and ethyl alcohol. Further, an achromatic water-soluble dye, e.g., carbon black or a titanium oxide-based material is added into the first liquid 121. That is, two liquids which are equal to each other in specific gravity and in refractive index, which differ from each other in ray absorption efficiency, and which are not mutually soluble are selected as the first and second liquids.

The two liquids exist as separate masses forming a boundary 124 therebetween without mixing with each other.

The optical element will be described with respect to the shape of the boundary 124.

First, when no voltage is applied to the first liquid, the shape of the boundary 124 is determined by the interfacial tension of the interface between the two liquids, the interfacial tension of the interface between the first liquid and the repellent film 111 on the insulating layer 104 or the hydrophilic film 112 on the insulating layer 104, the interfacial tension of the interface between the second liquid and the repellent film 111 or the hydrophilic film 112 on the insulating layer 104, and the volume of the second liquid. In this embodiment, the second liquid 122, i.e., silicone oil, and the material of the repellent film 111 are selected so that the interfacial tension therebetween is relatively small. That is, the wettability between the two materials is high and, therefore, the outer rim of the lens-like mass formed by the second liquid 122 has a tendency to spread out. When the second liquid 122 spreads out to cover the same area as the repellent film 111 application area, it becomes stable. That is, the diameter A1 of the bottom surface of the lens formed by the second liquid 122 is equal to the diameter D1 of the repellent film 111. Since the two liquids are equal in specific gravity, the force of gravity does not influence the positional relationship between the two liquids. Consequently, the boundary 124 forms a spherical surface and the radius of curvature and the height h1 thereof are determined by the volume of the second liquid 122. The thickness of the first liquid on the optical axis is t1.

When the switch 127 is operated close to apply a voltage to the first liquid 121, the interfacial tension of the interface between the first liquid 121 and the hydrophilic film 112 is reduced by electrocapillarity, so that the first liquid enters the region on the repellent film 111 by passing the boundary between the hydrophilic film 112 and the repellent film 111.

Figure 2:
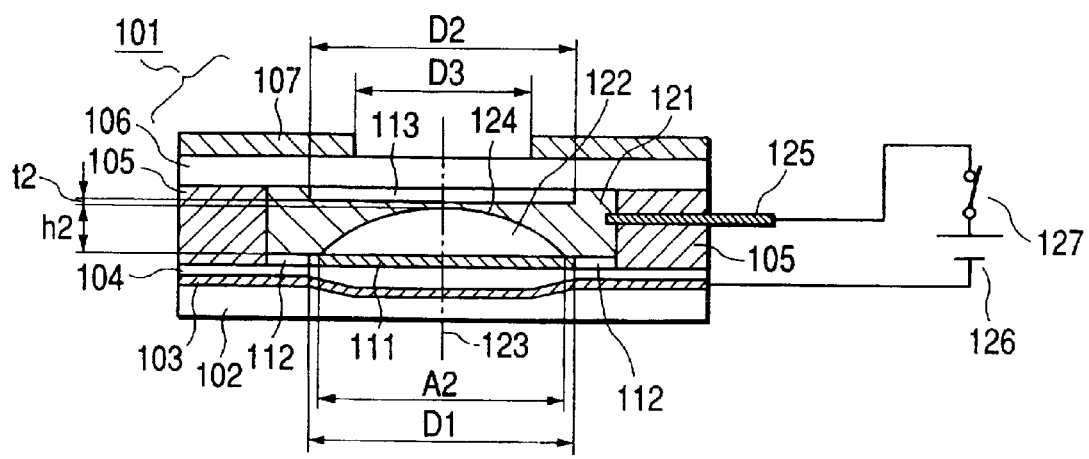
FIG. 2 is a diagram for explaining the operation of the optical element shown in FIG. 1 when a voltage is applied to the optical element.

As a result, the diameter of the bottom surface of the lens formed by the second liquid is reduced from A1 to A2 while the height is increased from h1 to h2 as shown in FIG. 2. The thickness of the first liquid on the optical axis becomes t2. Thus, the balance between the interfacial tensions of the two liquids is changed by application of a voltage to the first liquid 121 to change the shape of the boundary between the two liquids.

While the second liquid is substantially transparent, the first liquid has a certain ray absorbing effect because of the existence of a light absorbing material added to it. Therefore, when a bundle of rays is introduced through the aperture of the diaphragm plate 107, rays are absorbed by an amount according to the optical path length of the first liquid through which the bundle of rays passes, so that the intensity of the bundle of rays emergent from the transparent substrate 102 is reduced. That is, since the rate of reduction in the light intensity is proportional to the thickness of the first liquid on the optical axis (thickness t1 shown in FIG. 1 or thickness t2 shown in FIG. 2), the shape of the boundary 124 can be changed by voltage control of the power supply means 126. Therefore, the optical element can be realized as a device capable of freely changing the amount of light transmitted therethrough. Also, only the intensity of the bundle of emergent rays can be changed while the same direction as the direction of the incident bundle of rays is maintained, because the first and second liquids are equalized in refractive index.

Figure 3A:
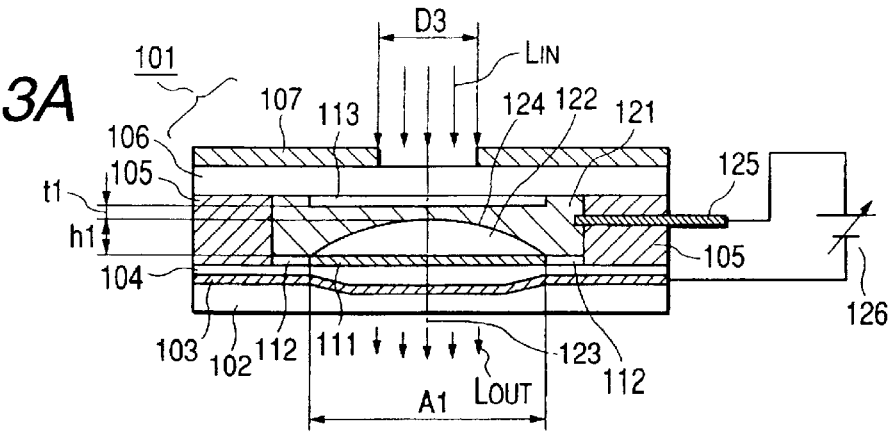
FIGS. 3A, 3B and 3C are diagrams for explaining the operation of the optical element shown in FIG. 1 in a case where the optical element is used as a variable ND filter.
Figure 3B:
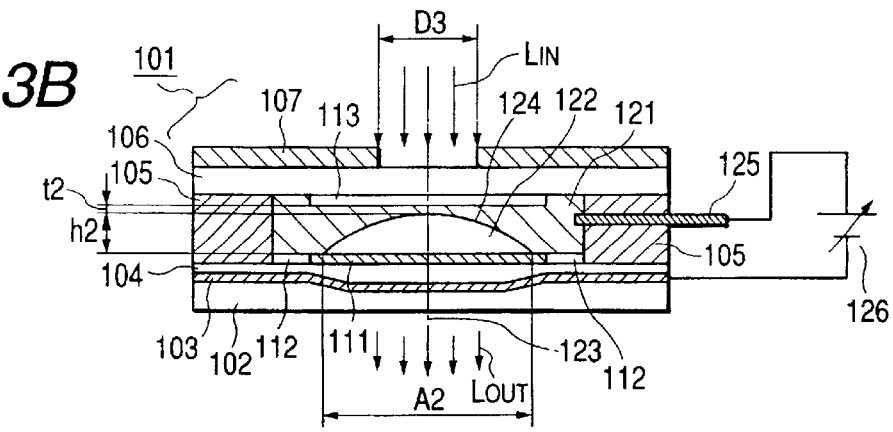
Figure 3C:
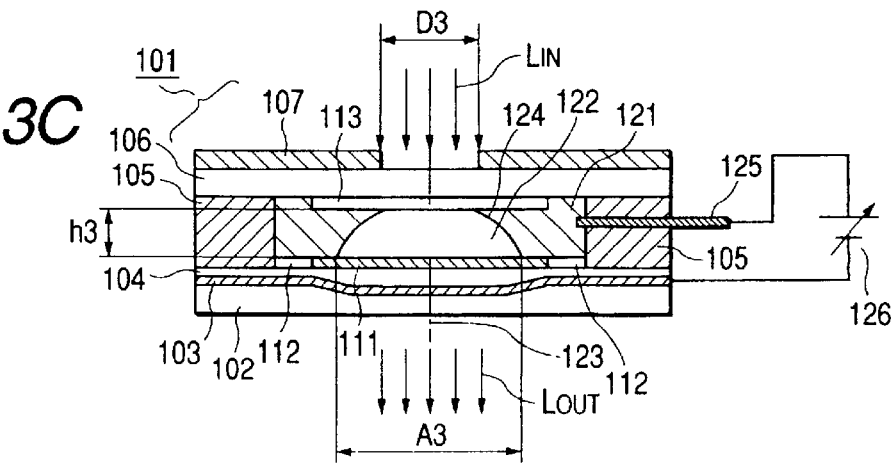

FIGS. 3A to 3C are diagrams for explaining further details of the optical element with respect to the operation in a case where the optical element is used as a variable ND filter.

FIG. 3A shows a state of the optical element 101 when the output voltage of the power supply means 126 connected to the optical element 101 is zero or an extremely voltage V1. The shape of the boundary 124 under this condition is the same as that shown in FIG. 1. The diameter of the bottom surface of the lens formed by the second liquid 122 is A1 and the height of the lens is h1. Also, the thickness of the first liquid on the optical axis is t1. $L_{IN}$ designates a bundle of rays traveling to the optical element 101 from above and entering the aperture of the diaphragm 107, and $L_{OUT}$ designates a bundle of rays emergent from the optical element 101. The ratio of the bundle of rays $L_{OUT}$ to the bundle of rays $L_{IN}$ is the transmittance of the optical element 101. In this state, since the thickness t1 of the first liquid on the optical axis is large, the transmittance is low. The distribution of the light quantity of the emergent bundle of rays $L_{OUT}$ is such that the light quantity at the outer end of the path is reduced with the increase in the distance from the optical axis, i.e., in accordance with height of emergent ray. However, the distribution of the light quantity of the bundle of emergent light $L_{OUT}$ can be regarded as generally uniform, because the opening diameter D3 of the diaphragm 107 is set to a value sufficiently smaller than the diameter A1 of the bottom surface of the lens formed by the liquid 122.

FIG. 3B shows a state when the output voltage of the power supply means 126 is V2 higher than V1. In this state, the diameter of the bottom surface of the lens formed by the second liquid 122 is A2 and the height of the lens is h2. Also, the thickness of the first liquid on the optical axis is t2 smaller than t1 shown in FIG. 3A. Accordingly, the transmittance of the bundle of rays is higher than that in the case shown in FIG. 3A.

FIG. 3C shows a state when the output voltage of the power supply means 126 is V3 higher than V2. In this state, the diameter of the bottom surface of the lens formed by the second liquid 122 is reduced to A3, and the crest of the boundary 124 contacts to the hydrophilic film 113 formed on the lower surface of the cover plate 106 and becomes flat. The diameter of this flat portion is equal to or larger than the diameter D3 of the aperture of the diaphragm 107. As a result, the thickness of the first liquid on the optical axis is zero. Consequently, the transmittance is further increased from the value in the case shown in FIG. 3B. Thereafter, when the output voltage of the power supply means 126 is increased further, the shape of the portion of the boundary 124 corresponding to the aperture of the diaphragm 107 is not changed and the transmittance of the optical element used as a variable ND filter remains constant. That transmittance in this state is expressed as the product of the transmittances of the transparent substrate 102, the transparent electrode 103, the insulating layer 104, the repellent film 111, the second liquid 122, the hydrophilic film 113, and the cover plate 106. When the voltage applied by the power supply means 126 is again set to V1 while the optical element is in the state shown in FIG. 3C, the interfacial tension of the interface between the two liquids recovers. In this event, since the wettability between the first liquid 121 and the hydrophilic film 113 is high while the wettability between the second liquid 122 and the hydrophilic film 113 is low, the second liquid separates from the hydrophilic film 113 and returns to the state shown in FIG. 3A. That is, the change in the shape of the boundary 124 of this optical element is reversible with respect to the change in the applied voltage.

Figure 4:
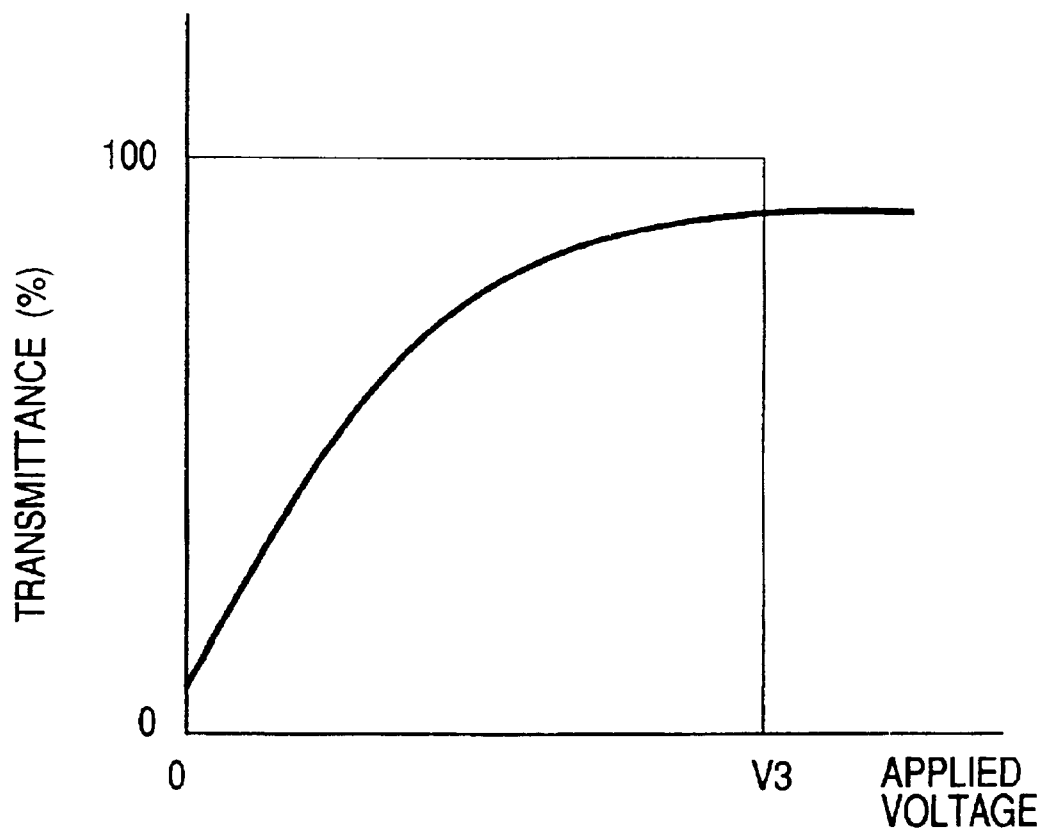
FIG. 4 is a diagram showing the relationship between the voltage to be applied to the optical element shown in FIG. 1 and the transmittance of the optical element with respect to a light flux.

FIG. 4 shows the relationship between the voltage applied to the optical element 101 and the transmittance of the optical element 101. When the applied voltage is increased, the transmittance also becomes higher. When the applied voltage becomes equal to V3, the transmittance is saturated.

Figure 5:
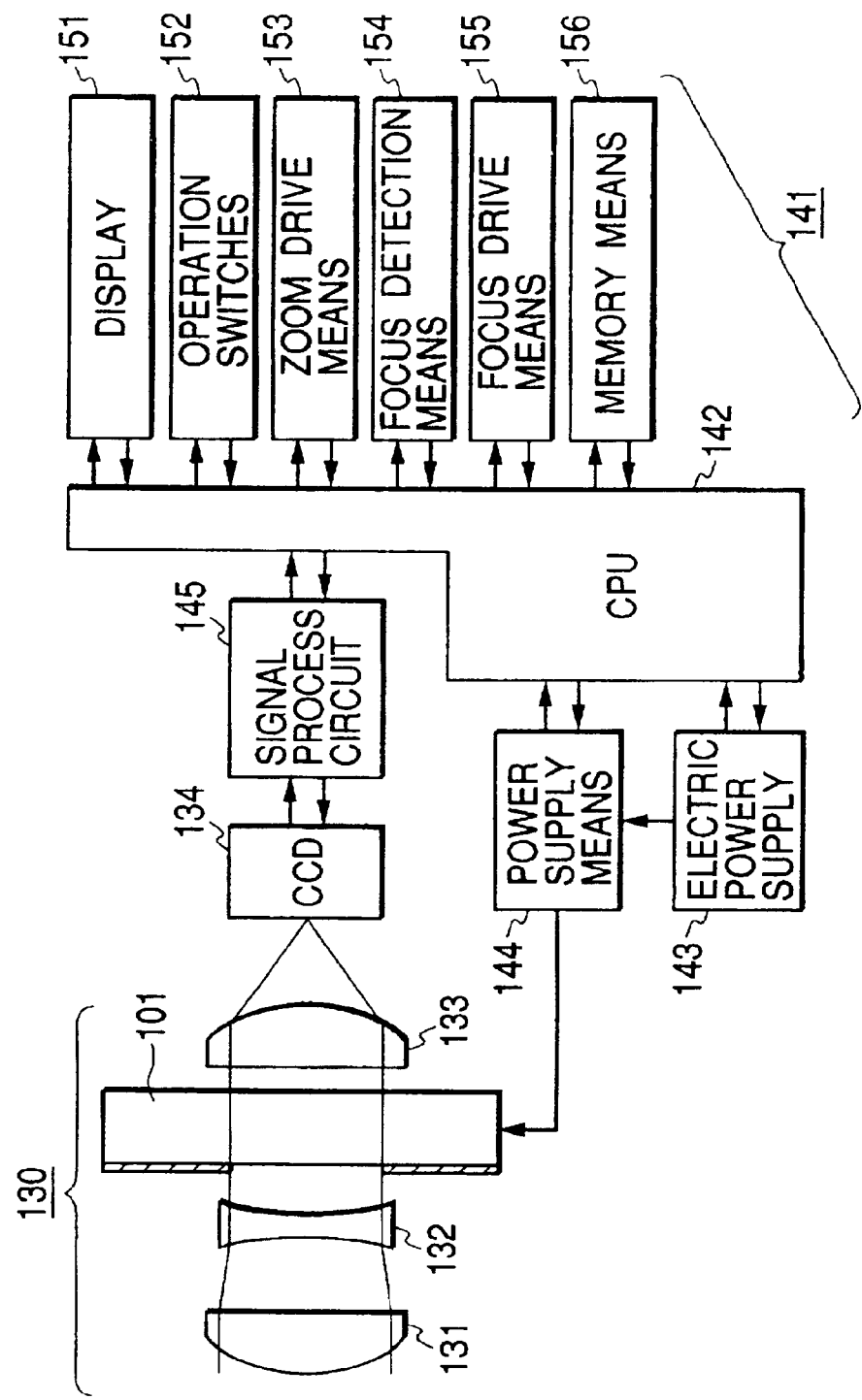
FIG. 5 is a diagram showing a photo-taking device using the optical element shown in FIG. 1.

FIG. 5 shows an example of application of the optical element 101 to a photo-taking device. In this embodiment, the photo-taking device 141 will be described as a digital still camera in which a still image is converted into an electrical signal by an image pick-up means based on a photoelectric effect and the converted signal is recorded as digital data.

An imaging optical system 130 is constituted by a plurality of lens groups: a first lens group 131, a second lens group 132, and a third lens group 133. Focusing is performed through the movement of the first lens group 131 along the optical axis. Zooming is performed through the movement of the second lens group 132 along the optical axis. The third lens group 133 is a relay lens group, which is not moved. The optical element 101 is placed between the second lens group 132 and the third lens group 133. An image pick-up means 134 is placed at a focus point (a supposed image formation plane) of the imaging optical system 130. A photoelectric conversion means, such as a two-dimensional charge-coupled device (CCD), constituted by a plurality of photoelectric conversion portions for converting energy of irradiated light into electric charge, charge accumulating portions for accumulating the charge, and a charge transport portion for transferring and outputting the charge, is used as image pick-up means 134.

A central processing unit (hereinafter referred to as CPU for brevity) 142 for overall control of the operation of the photo-taking device is a one-chip microcomputer having a read-only memory (ROM), a random-access memory (RAM), an electrically erasable and programmable ROM (EEPROM), an analog to digital (A/D) conversion function, and a digital to analog (D/A) conversion function. An electric power supply 143 is a means for supplying electric power to the CPU 142, to various circuits in the photo-taking device, and to actuators. A power supply means 144 is a means for applying a voltage to the optical element 101. The power supply means 144 corresponds to the power supply 126 shown in FIG. 1. The power supply means 144 outputs a required voltage according to a control signal from the CPU 142. An image signal processing circuit 145 is a circuit for converting an analog image signal input from the photoelectric conversion means 135 into a digital signal, and for performing various kinds of image processing, such as AGC, white balance control, γ-correction, and edge enhancement.

A display 151, which is a liquid crystal display device or the like, displays a subject image obtained by the photoelectric conversion means 134 and information on the state of operation of the photo-taking device. A group of operation switches 152 is constituted by a main switch for activating the CPU 142 from a sleeping state to a program executing state, a photography preparation switch, a photo-taking start switch, and photographic condition setting switches for setting a shutter speed, etc. A zoom drive means 153 includes an actuator and a driver circuit for moving the second lens group 132 along the optical axis. The zoom drive means 153 performs a magnification changing operation to change the focal length of the imaging optical system 130 according to a zooming switch operation performed by an photographer. A focus detection means 154 is, preferably, a phase difference detection type of focus detection means used for single-lens reflex cameras. A focus drive means 155 includes an actuator and a driver circuit for moving the first lens group 131 along the optical axis. The focus drive means 155 performs a focusing operation to control a focus condition of the imaging optical system 130 on the basis of a focus signal calculated by the focus detection means 154. A memory means 156 records an image signal obtained by a photo-taking operation. Specifically, a detachable personal computer card (PC card) type of flash memory is preferably used as memory means 156.

The operation of the optical element 101 in this arrangement will next be described. The dynamic range of brightness of objects existing in the realm of nature is extremely wide. To set any level of brightness of such objects to a value within predetermined limits, a mechanical diaphragm is ordinarily provided in an imaging optical system to control the light quantity of a bundle of rays introduced by a photo-taking operation. However, it is difficult to reduce the size of the mechanical diaphragm and there is the problem of a reduction in the resolution of a subject image due to the phenomenon of diffraction of rays by diaphragm blade end surfaces under a small-aperture condition when the aperture of the diaphragm is reduced. According to the present invention, the optical element 101 is used as a variable ND filter substituted for the mechanical diaphragm, thereby enabling suitable control of the quantity of light passing through the imaging optical system without yielding the above drawbacks.

Figure 6:
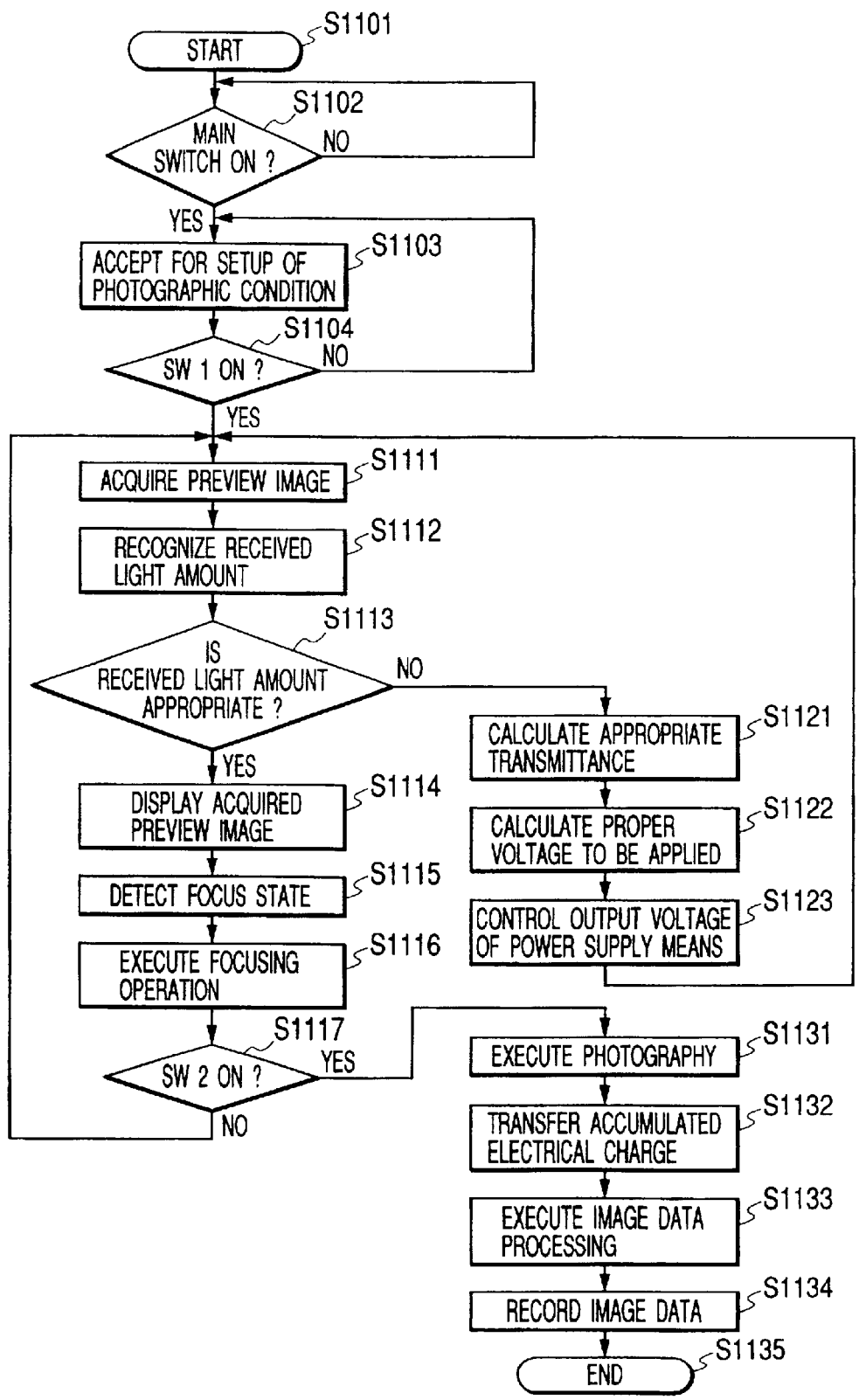
FIG. 6 is a flowchart of a control process in the phototaking device shown in FIG. 5.

FIG. 6 is a flowchart showing a control process performed by the CPU 142 of the photo-taking device 141 shown in FIG. 5. The control process in the photo-taking device 141 will be described with reference to FIGS. 5 and 6.

After a start in step S1101, a determination is made in step S1102 as to whether the main switch has been turned on by the photographer. If the main switch has not been operated, a step S1102 is held. If it is determined in step S1102 that the main switch has been turned on, the CPU 142 is activated from the sleeping state and executes the step S1103 and other subsequent steps.

In step S1103, inputs entered by the photographer to set photographic conditions are accepted. More specifically, the photographer sets an exposure control mode (e.g., a shutter priority AE or programmed AE mode), an automatic focusing mode (e.g., a one-shot AF or a continuous AF mode), a drive mode (e.g., a single-frame shooting or continuous shooting mode), an image quality mode (e.g., a mode for changing the number of recorded pixels or the image compression rate), etc., by using the group of operation switches 152 and display 151.

In step S1104, a determination is made as to whether the photography preparation switch (represented by SW1 in the flowchart) has been turned on by the photographer. If the switch has not been turned on, the process returns to step S1103 for acceptance of inputs for setting of photographic conditions. If it is determined in step S1104 that the photography preparation switch has been operated, step S1111 and other subsequent steps are performed immediately after step S1104.

In step S1111, the image pick-up means 134 and the signal processing circuit 145 are driven to obtain a preview image, which is an image obtained before photographing of the desired image or a final recording image to enable the photographer to confirm his or her composition of photography and to correctly set photographic conditions for the final recording image.

In step S1112, the level of received light of the preview image obtained in step S1111 is recognized. More specifically, the maximum, minimum and average output signal levels in the image signal output from the image pick-up means 134 are calculated to recognize the amount of light incident upon the image pick-up means 134.

In step S1113, a determination is made as to whether the amount of received light recognized in step S1112 is appropriate. If it is determined in step S1113 that the amount of received light is appropriate, the process advances to step S1114.

In step S1114, the preview image obtained in step S1111 is displayed on the display 151. In step S1115, the state of focusing of the imaging optical system 130 is detected by using the focus detection means 154. In step S1116, the first lens group 131 is moved along the optical axis by the focus drive means 155 to perform focusing. Thereafter, in step S1117, a determination is made as to whether the photo-taking switch (represented by SW2 in the flowchart) has been turned on. If the switch has not been turned on, the process returns to step S1111 and the steps from obtaining a preview image to focus driving are repeated.

On the other hand, if it determined in step S1113 that the amount of received light recognized in step S1112 is not appropriate, the process jumps to step S1121. In step S1121, the amount of light actually received and the appropriate light amount to be received are compared and the appropriate transmittance of the optical element 101 in the imaging optical system 130 is calculated. In step S1122, the control voltage for obtaining the appropriate transmittance calculated in step S1121 is calculated. More specifically, the relationship between the applied voltage and the transmittance shown in FIG. 4 is stored as a look-up table in the ROM of the CPU 142. The applied voltage corresponding to the transmittance therefore calculated in step S1121 is obtained by referring to this look-up table.

In step S1123, the output voltage of the power supply means 144 is controlled so that the voltage determined in step S1122 is applied to the optical element 101. After the execution of operation in step S1123, the process returns to step S1111 and the steps from obtaining a preview image to controlling power supply means are repeatedly executed until the amount of light incident upon the image pick-up means 134 becomes appropriate. When the amount of light incident upon the image pick-up means 134 becomes appropriate, the process advances from step S1113 to step S1114.

As is described, if the photo-taking switch is turned on by the photographer while the photography preparation steps are repeatedly executed, the process jumps from step S1117 to step S1131. In step S1131, a image is taken. That is, the subject image imaged on the image pick-up means 134 is converted by photoelectric conversion to accumulate charges proportional to the intensities of the optical image onto the charge accumulating portions in the vicinity of light receiving portions.

In step S1132, the charges accumulated in step S1131 are read out via charge transport lines, and an analog signal obtained by this reading is input to the signal processing circuit 145.

In step S1133, the input analog signal undergoes A/D conversion and processing for AGC control, white balance, γ-correction, edge enhancement, etc., in the signal processing circuit 145. Also, the signal further undergoes JPEG compression or the like based on an image compression program stored in the CPU 142 if necessary.

In step S1134, the image signal obtained in the step S1133 is recorded in the memory 156. The photo-taking operation is terminated in step S1135.

As is apparent from the foregoing, an ND filter capable of controllably setting the ray bundle transmittance to the desired value by controlling the voltage applied to an optical element can be obtained by being arranged on the basis of the above-described principle. If this optical element is substituted for a mechanical diaphragm in an imaging optical system of a photo-taking device, the need for mechanical means such as diaphragm blades and an aperture control mechanism can be eliminated and the amount of light incident upon an image pick-up means can be continuously controlled. Therefore, the photo-taking device can be made smaller in size and improved in performance.

An example of the construction of an optical element and an example of the method of controlling the optical element, considered to be a basis for the following description of the present invention, have been described with reference to FIGS. 1 through 6.

Embodiments of the present invention will now be described below.

(First Embodiment)

The construction of an optical element used in an optical system in first embodiment of the present invention will be described with reference to FIGS. 7A and 7B.

Referring to FIGS. 7A and 7B, a container 7 is made of an insulating material, contains liquids described below, and is transparent in the horizontal direction as viewed in FIGS. 7A and 7B (in the direction along which light incident on the optical element travels through the same to exit), as is the corresponding case described above with reference to the diagrams for explaining the principle of the present invention.

A second liquid 8 is contained in the container 7. The second liquid 8 is constituted by transparent silicone oil in this embodiment. A first liquid 9 having a light shielding effect with respect to visible light is also contained in the container 7. The first liquid 9 is constituted by an aqueous electrolyte in which sodium chloride is dissolved, for example, and in which carbon particles are mixed.

An electrode 10 for applying to the electrolyte 9 a voltage supplied from the outside is connected to a control circuit (not shown). An alternating current electric field at about ±200 V is applied to the electrolyte 9 through the electrode 10. The first and second liquids are substantially equal in refractive index but differ from each other in transmittance like those in the optical element shown in FIG. 1.

A second electrode 11 in the shape of a ring is embedded in the insulating member forming the container 7, and is also connected to the control circuit (not shown). An alternating current electric field at about ±200 V is applied to the electrolyte 9 through the second electrode 11 in phase opposition to that applied through the electrode 10.

A bundle of rays 12 cannot pass through this optical device in the state shown in FIG. 7A, because it is shielded by the first liquid 9. On the other hand, transmitted light 13 is output rightward as viewed in FIG. 7B from this optical device in the state shown in FIG. 7B, because the second liquid having a light shielding effect is forced outward by the electric field.

When the control circuit (not shown) applies ac voltages to the electrodes 10 and 11 to open the diaphragm or shutter of the camera from a non-energizing state, the diaphragm or shutter is opened as shown in FIG. 7B. The amount of this opening relates to the voltage applied between the electrodes 10 and 11. Therefore, the amount of light passing through the optical element can be arbitrarily set by changing the voltage.

Figure 11A:
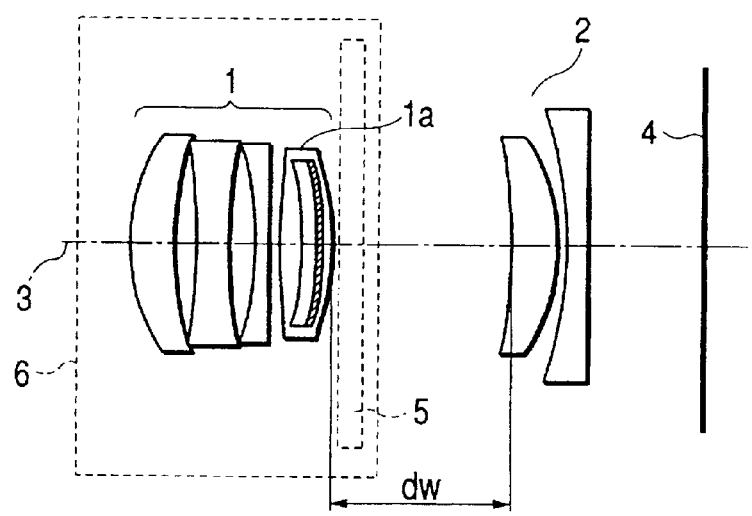
FIGS. 11A and 11B are diagrams showing an optical system formed by using the lens capable of functioning as a shutter and as a diaphragm in third embodiment of the present invention.
Figure 11B:
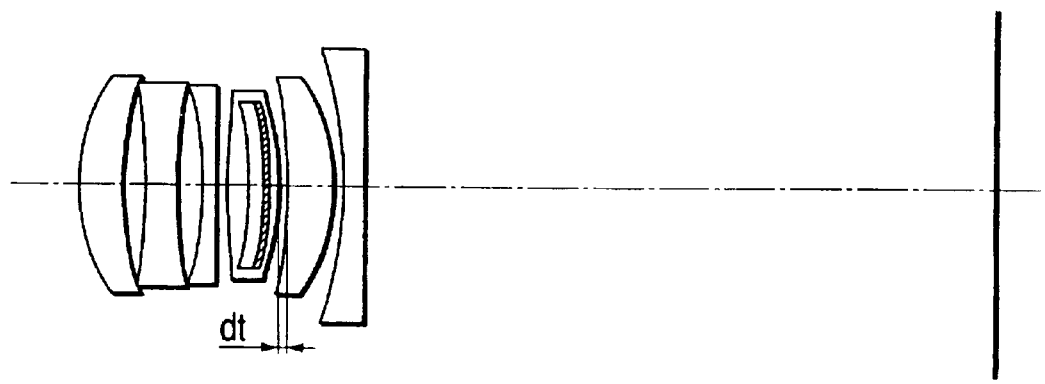

In this embodiment, the above-described optical element is used to form a diaphragm or a shutter and is incorporated in an imaging lens. For example, as shown in FIGS. 11A and 11B, a lens 1a, which functions both as a shutter and as a diaphragm, is formed and is placed at the end of a lens group closest to an image formation plane 4. In this manner, an optical system smaller in size and improved in performance can be achieved.

This optical system will be described in more detail with reference to FIGS. 11A and 11B.

The optical system shown in FIGS. 11A and 11B is formed as an optical system which is of a type formed by two groups of convex and concave lenses, which is ordinarily used in lens shutter cameras, and in which lenses are supported by well-known members, i.e., a lens frame, a cam cylinder, actuators, structural members, and control means. FIG. 11A shows a wide-angle state while FIG. 11B shows a telephoto state. The optical system shown in FIGS. 11A and 11B has the lens 1a which functions both as a shutter and as a diaphragm corresponding to the optical system in third embodiment described below. The functions are not limited to third embodiment but are basically the same as this embodiment.

Referring to FIG. 11A, a first lens group is constructed by a convex lens, a concave lens, another concave lens, and another convex lens, and forms a convex lens as a whole. As described above, the lens 1a functioning as a shutter and a diaphragm is provided closest to the image formation plane 4 described below.

A second lens group is constructed by a meniscus lens and a convex lens and forms a concave lens as a whole. A lens optical axis is indicated by 3 and the image formation plane 4 is a plane on which a CCD or film is to be placed. The air spacing between the first and second groups of lenses is indicated by d. The air spacing d is changed by a lead cam formed on a cam cylinder (not shown), thereby enabling the first lens group 1 and the second lens group 2 to be moved on a predetermined line to change the magnification ratio of image formation from the field of depth defined on the left-hand side in the figure. Thus, a zoom lens is constructed.

Broken line 5 in FIG. 11A designates a necessary diaphragm-shutter unit in a conventional lens unit, and broken line 6 designates a conventional lens frame supporting one lens group 1 and the diaphragm-shutter unit 5.

As is apparent from FIGS. 11A and 11B, if the conventional diaphragm-shutter unit 5 exists, the lens units of the first lens group 1 and the second lens group 2 cannot be brought close to each other as shown in FIG. 11B, and therefore the zoom magnification is lower than that in this embodiment of the present invention (the zoom magnification is determined by the lens magnifications of the first and second group lens groups 1 and 2 and the change in air spacing, i.e., dw-dt).

Also, the size of the conventional diaphragm-shutter unit in the direction perpendicular to the optical axis (ordinarily called "outside diameter") is ordinarily large because of the need for a space allowing the opening movement of the mechanical diaphragm blades and shutter blades, and therefore generally the outside diameter of the lens frame 6 accommodating the diaphragm-shutter unit is also large.

In contrast, in the arrangement of this embodiment, the distance between the lens groups in the telephoto state can be minimized as indicated by dt as shown in FIG. 11B, and therefore the zoom magnification can be advantageously increased in comparison with the conventional zoom lens.

(Second Embodiment)

Figure 8A:
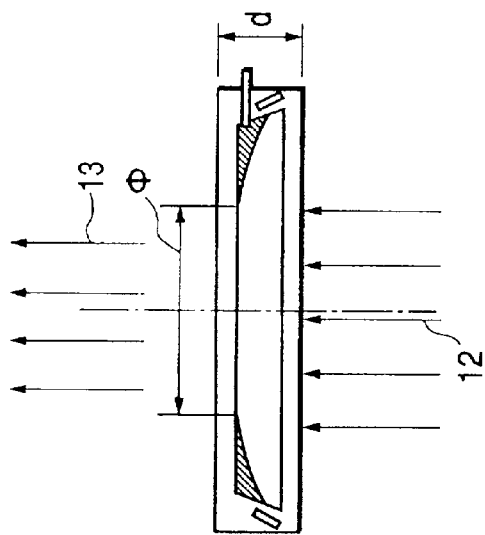
FIGS. 8A, 8B and 8C are diagrams showing the construction of an optical device in second embodiment of the present invention.
Figure 8B:
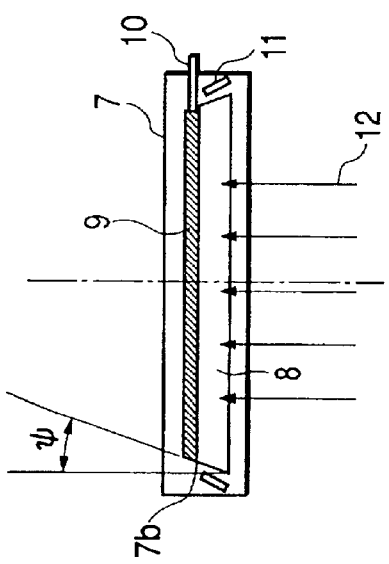
Figure 8C:
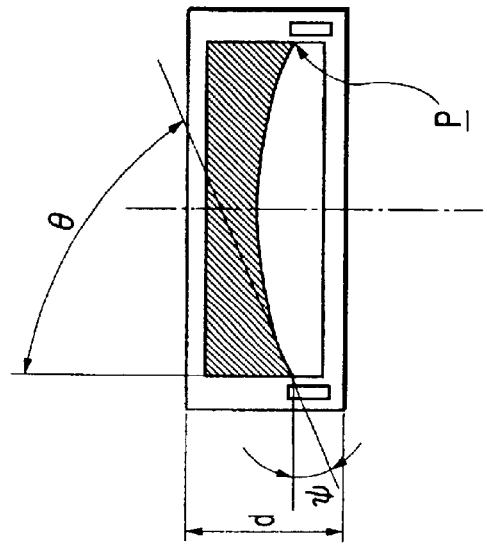

FIGS. 8A to 8C show the construction of an optical element in second embodiment of the present invention. In second embodiment, liquids can be contained in a container in a state of being reduced in thickness in the direction along the optical axis in comparison with those in first embodiment, so that the overall size of the optical element can be further reduced.

FIG. 8A shows a basic arrangement similar to that shown in FIGS. 7A and 7B. The state of the boundary between the first and second liquids will be discussed by paying attention to a point P at which the inner side surface of the container and the first and second liquids meet each other. An interfacial condition is formed on a line having an angle $\psi$ from a horizontal line as viewed in FIG. 8A and tangent to the boundary surface between the two liquids. Energizing through electrodes 10 and 11 from this state causes a change in the interfacial condition such that the angle $\psi$ is namely increased ($\theta$ is a contact angle and the relationship between $\theta$ and $\psi$ is $\psi=90°-\theta$).

Figure 9:
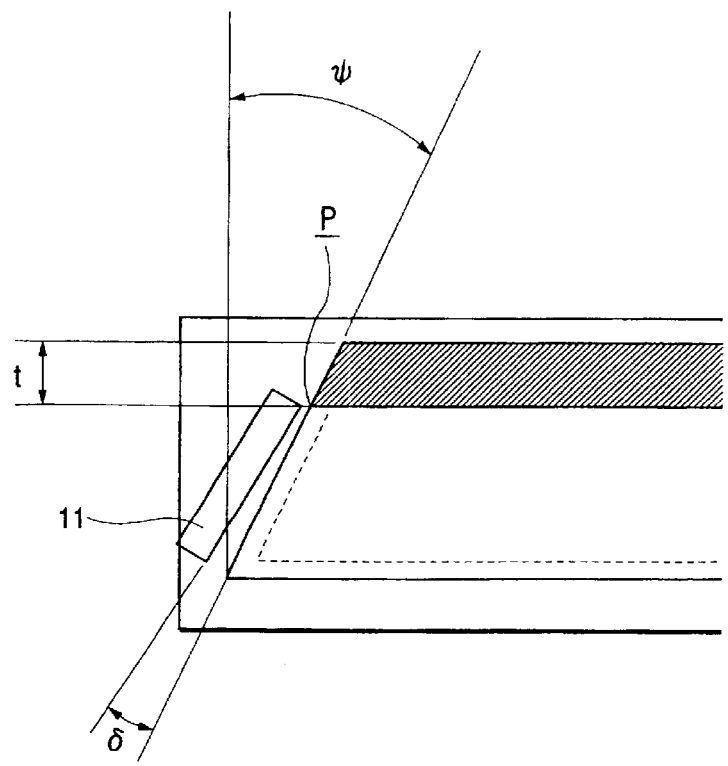
FIG. 9 is an enlarged diagram of a portion about a point P in FIG. 8B.

It can be understood that the thickness d of the above-described unit can be minimized (the unit can be made thinner) if the unit is constructed so that the angle $\psi$ is zero. Therefore, the side surface of the container may be formed by being slanted at an angle $\psi$, as indicated at 7b in FIG. 8B, to form a thinner unit, as shown in FIG. 8B. FIG. 9 is an enlarged diagram of a portion of FIG. 8B about the point P. In FIG. 9, t designates the thickness of the layer of the aqueous solution (electrolyte). The range of t=0.1 to 0.5 mm is preferred as a condition for making the optical element satisfactory in terms of both light shielding effect and compactness.

The angle $\psi$ relates to the contact angle between the side surface of the container and the boundary surface between the two liquids, as shown in FIG. 8A, and is set so that the boundary surface is generally flat, as shown in FIGS. 8B or 9. The ring-shaped electrode 11 is formed so as to be inclined at a small angle $\delta$ from the inner side surface of the container, and so that the distance between the electrode 11 and the inner side surface of the container is minimized, for example, it is set to about 10 to 30$\mu$. The inner surface of the container indicated by the broken line in FIG. 9 is treated in advance by a well-known method to have such a property as to repel aqueous solution 9. Also in this embodiment, the two liquids are equal in refractive index but different from each other in transmittance.

In the thus-constructed optical element, the shape of the boundary surface between the two liquids is changed as shown in FIG. 8C by energizing with the power supply means 144 shown in FIG. 5 to allow light from below as viewed in the figure to travel upward therethrough. Thus, the optical element can function as a shutter and as a diaphragm. The diameter $\phi$ of the aperture thereby opened is generally proportional to the voltage from the power supply means 144, as described above.

The important point to be noted with respect to this state is that the light-shielding aqueous solution (electrolyte) existing close to and outside the circumference of the aperture indicated by $\phi$ in FIG. 8C increases gradually in thickness, in an outward direction from the aperture, from an extremely thin state, i.e., a state of allowing most of incident light to pass therethrough, to a completely shielding state (gradually reduces the amount of transmitted light), and that, because of this change in state, an apodization diaphragm is realized which is free from the problem of diffraction of light at a diaphragm edge causing a deterioration in image quality.

(Third Embodiment)

Figures 10A, 10B, 10C:
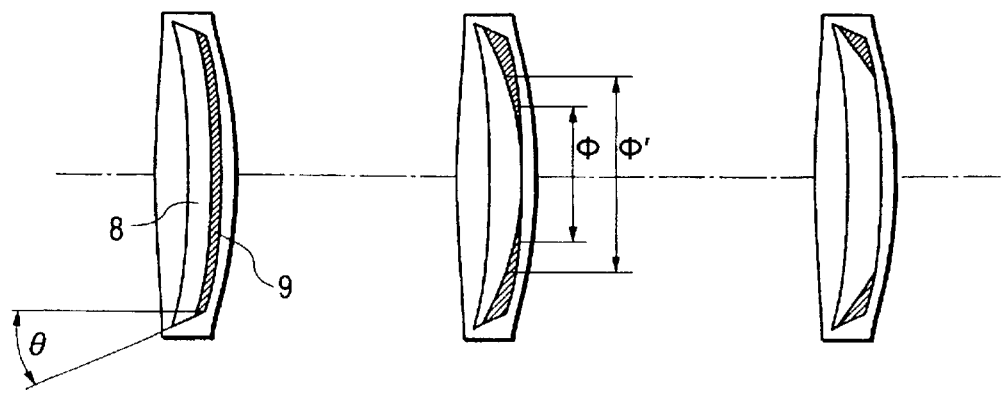
FIGS. 10A, 10B and 10C are diagrams showing the construction of a lens capable of functioning as a shutter and as a diaphragm in third embodiment of the present invention.

FIGS. 10A to 10C show the construction of a lens in third embodiment which functions both as a shutter and as a diaphragm, and which is constructed as in such a manner that a diaphragm or a shutter formed based on the basic construction of second embodiment is incorporated in a lens element to form a lens corresponding to the lens 1a shown in FIGS. 11A and 11B, and capable of functioning both as a shutter and as a diaphragm.

FIG. 10A shows a non-energized state where the diaphragm-shutter unit is completely closed to stop light from passing through the lens, FIG. 10B shows a state where the diaphragm-shutter unit is opened halfway to allow partial transmission of light, and FIG. 10C shows a fully-opened state.

In the state shown in FIG. 10B, an apodization diaphragm is realized which consists of a central portion of the diameter φ allowing complete (close to 100%) transmission like that in the above-described examples, and a substantially half-transmission portion defined between the circle of diameter φ' and the circle of diameter φ and characterized by gradual change of the transmittance from the inner-diameter end to the outer-diameter end. Thus, advantageously high optical performance of a diaphragm can be achieved.

(Fourth Embodiment)

Figure 12A:
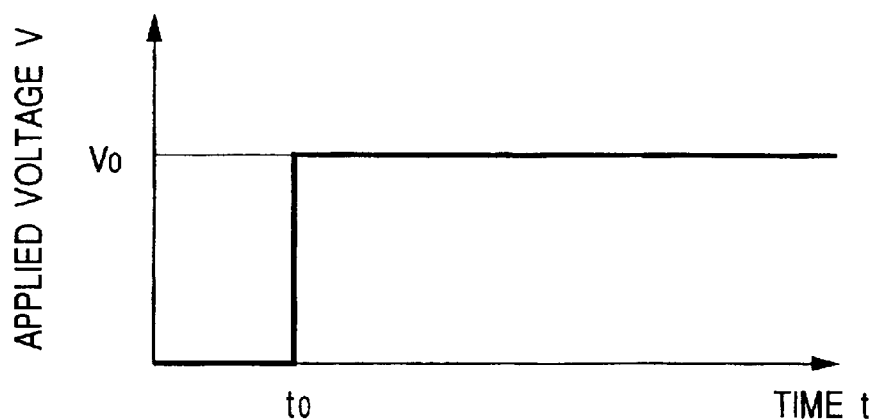
FIGS. 12A and 12B are diagrams showing the relationship between the output voltage from a power supply means and change of the shape of an optical element or a lens in fourth embodiment of the present invention when the voltage from the power supply means is applied to the lens.
Figure 12B:
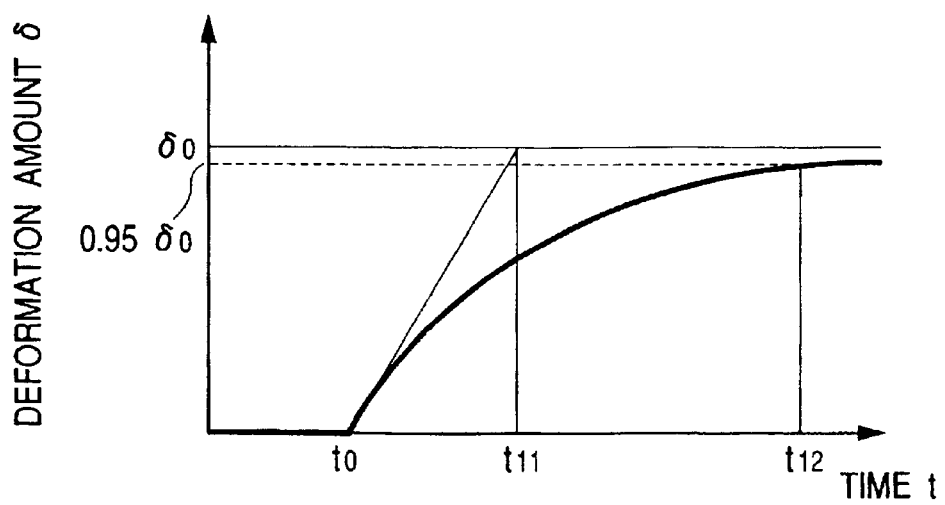

FIGS. 12A and 12B are diagrams showing the relationship between the output voltage from the power supply means 126 and the change in the shape of the boundary 124 in the optical element 101 shown in FIGS. 1 through 3.

Referring to FIG. 12A, a voltage $V_0$ is applied to the optical element 101 at a time $t_0$ to cause the boundary 124 in the optical element 101 to start changing in shape with a time constant $t_{11}$ (see FIG. 12B). Application of the voltage for a substantially long time is required to enable the boundary 124 to have the desired amount of change $\delta_0$. In an application of the optical element to an optical system, therefore, an acceptable amount of change in the shape of the boundary 124 relative to the desired amount $\delta_0$, e.g., 95% of the desired amount (0.95 $\delta_0$) (reached at a time $t_{12}$) indicated in FIG. 12B is regarded as equivalent to the desired amount by setting a tolerance. A control condition is set such that the next step in control of the optical element 101 is not started before this amount of change in shape is reached. Such a tolerance on the amount of change in shape is determined as a value specific to an optical system in which the optical element 101 is incorporated.

Figure 13:
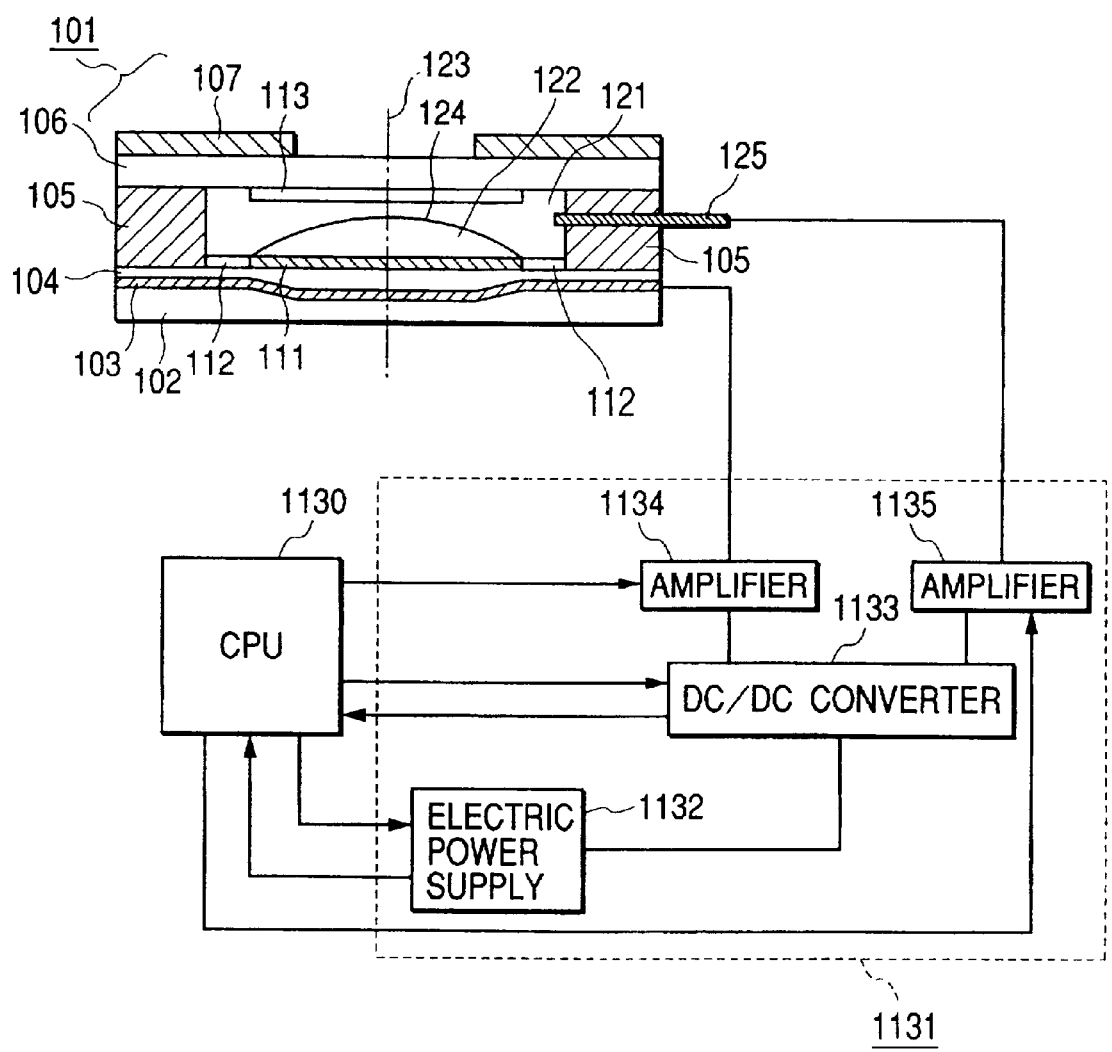
FIG. 13 is a diagram for explaining a power supply means for a variable-focus lens in fourth embodiment of the present invention.

FIGS. 13 and 14 are diagrams for explaining a power supply means 1131 relating to a variable-focus lens having an optical element based on the above-described basic construction. FIG. 13 shows a driver circuit suitable for forming the power supply means 1131, and FIGS. 14A to 14E show the drive voltages of the driver circuit.

The configuration of the power supply means and the method of designing the power supply means will be described with reference to FIG. 13 and FIGS. 14A to 14E.

A central processing unit (CPU) 1130 for overall control of the operation of an optical device 1150 described below is a one-chip microcomputer having a ROM, a RAM, an EEPROM, an A/D conversion function, a D/A conversion function, and a pulse width modulation (PWM) function. The power supply means 1131 is a means for applying voltages to the optical element 101. The configuration of the power supply means 1131 is as described below.

The power supply means includes a dc power supply 1132, e.g., a battery incorporated in the optical device 1131, a DC/DC converter 1133 for converting the voltage output from the power supply 1132 into the desired voltage according to a control signal from the CPU 1130, and amplifiers 1134 and 1135 which operate according to a control signal from the CPU 1130, e.g., a frequency/duty ratio variable signal for realizing a PWM function, to amplify the level of this signal to the level of the voltage converted by the DC/DC converter 1133. The amplifier 1134 is connected to the transparent electrode 103 of the optical element 101 while the amplifier 1135 is connected to the rod electrode 1125 of the optical element 101. That is, an output voltage of the power supply 1132 is subjected by the DC/DC converter 1133 and the amplifiers 1134 and 1135 as to have the desired voltage, frequency and duty ratio according to the control signal from the CPU 1130 and is applied to the optical element 101.

FIGS. 14A through 14E are diagrams for explaining voltage waveforms output from the above-described amplifiers 1134 and 1135. For the following description, it is assumed here that a voltage of 100 V is output from the DC/DC converter 1133 to each of the amplifiers 1134 and 1135.

Figure 14A:
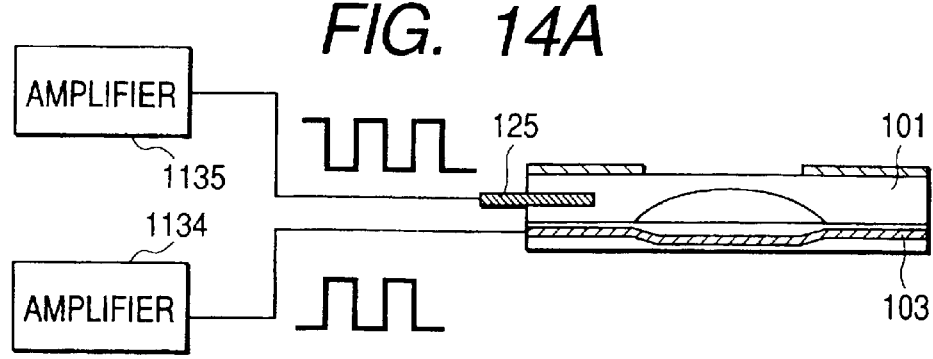
FIGS. 14A, 14B, 14C, 14D and 14E are diagrams showing driving voltages applied to the optical element based on the basic construction or the variable-focus lens in fourth embodiment of the present invention.
Figure 14B:
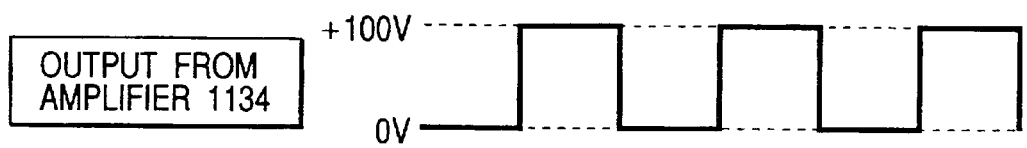

As also shown in FIG. 14A, the amplifiers 1134 and 1135 are respectively connected to the optical element 101. As shown in FIG. 14B, the amplifier 1134 outputs voltage having a rectangular waveform of the desired frequency and duty ratio according to the control signal from the CPU 1130.

Figure 14C:
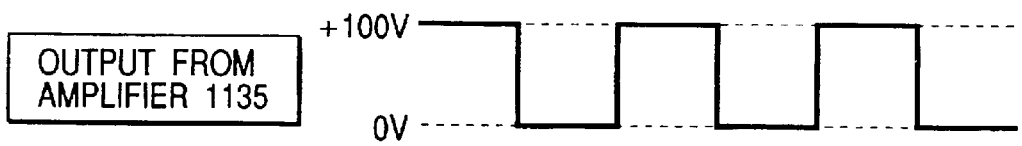
Figure 14D:
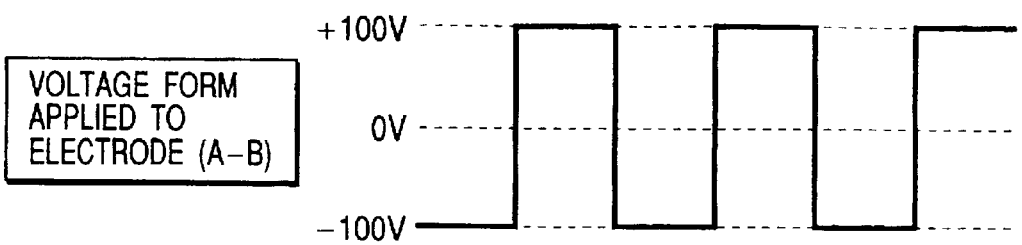

On the other hand, the amplifier 1135 outputs, as shown in FIG. 14C, a rectangular waveform voltage of the same frequency and duty ratio according to the control signal from the CPU 1130 but in phase opposition to that from the amplifier 1134. Consequently, the voltage applied between the transparent electrode 103 and the rod electrode 125 of the optical element 101 is a voltage of ±100 V with a rectangular waveform, i.e., an ac voltage, as shown in FIG. 14D.

Figure 14E:
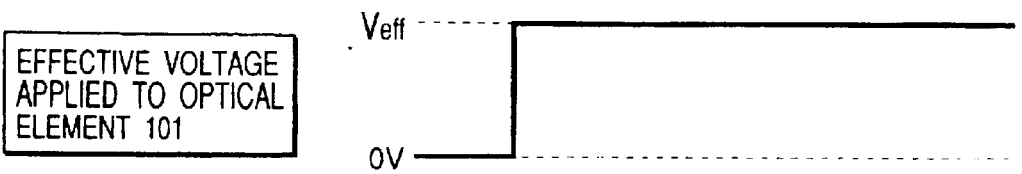

Thus, the power supply means 1131 applies an ac voltage to the optical element 101. The effective value of the voltage applied to the optical element 101 during a certain time period from the start of application can be expressed as shown in FIG. 14E. The waveform shown in FIG. 14E will be referred to as a waveform representing the ac voltage applied to the optical element 101.

The voltages output from the amplifiers 1134 and 1135 have been described as voltages with rectangular waveforms. Needless to say, the power supply means also has the same configuration even if the amplifiers output sine waves.

A case where the power supply 1132 is incorporated in the optical device 1131 has been described. However, an ac voltage may be applied to the optical element 101 from an external power source or power supply means.

Figure 15:
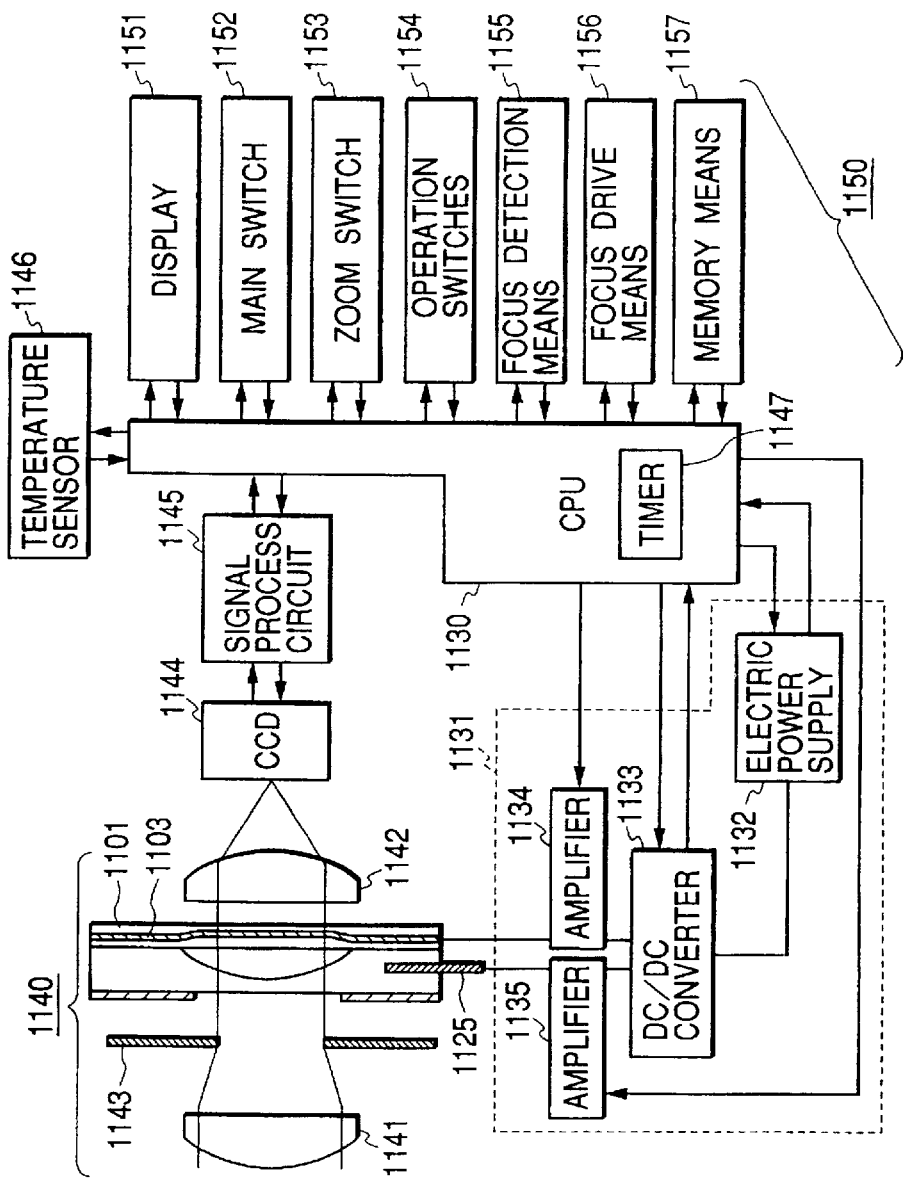
FIG. 15 is a diagram showing a system for an optical device to which the optical element based on the basic construction and the variable-focus lens in fourth embodiment of the present invention is applied.

FIG. 15 shows an application of the optical element 101 to an optical device 1150. The optical device 1150 of this embodiment will be described as a digital still camera in which a still image is converted into an electrical signal by an image pick-up means based on a photoelectric effect and the converted signal is recorded as digital data.

An imaging optical system 1140 is constituted by a plurality of lens groups: a first lens group 1141, a second lens group 1142, and the optical element 101. Focusing is performed through the movement of the first lens group 1141 along the optical axis. Zooming is performed by changing the power of the optical element 101. The second lens group 1142 is a relay lens group, which is not moved. The optical element 101 is placed between the first lens group 1141 and the second lens group 1142. A diaphragm unit 1143 whose aperture is controlled by a well-known technique to adjust the light quantity of a bundle of rays for photography is placed between the first lens group 1141 and the optical element 101.

An image pick-up means 1144 is placed at a focus point (a supposed image formation plane) of the imaging optical system 1140. A photoelectric conversion means, such as a two-dimensional CCD, constituted by a plurality of photoelectric conversion portions for converting energy of irradiated light into electric charge, charge accumulating portions for accumulating the charge, and a charge transport portion for transferring and outputting the charge is used as image pick-up means 1144.

An image signal processing circuit 1145 is a circuit for converting an analog image signal supplied from the image pick-up means 1144 into a digital signal, and for performing various kinds of image processing, such as AGC control, white balance control, γ-correction, and edge enhancement. A sensor 1146 is provided to measure the temperature (atmospheric temperature) of an environment surrounding the optical device 1150. A timer 1147 is provided within the CPU 1130 and counts for timing according to a time set by the CPU 1130.

A display 1151, which is a liquid crystal display device or the like, displays a subject image obtained by the image pick-up means 1144 and information on the state of operation of the optical device having the variable-focus lens. A main switch 1152 is operated to activate the CPU 1130 from a sleeping state to a program executing state. A zoom switch 1153 is operated by a photographer to perform a magnification changing operation described below by changing the focal length of the imaging optical system 1140. A group of operation switches 1154 other than the above-described switches is constituted by a photography preparation switch, a photo-taking start switch, and photographic condition setting switches for setting a shutter speed, etc. A focus detection means 1155 is, preferably, a phase difference detection type of focus detection means used for single-lens reflex cameras. A focus drive means 1156 includes an actuator and a driver circuit for moving the first lens group 1141 along the optical axis. The focus drive means 1156 performs a focusing operation to control a focus condition of the imaging optical system 1140 on the basis of a focus signal calculated by the focus detection means 1155. A memory means 1157 records an image signal obtained by a photo-taking operation. Specifically, a detachable PC card type of flash memory or the like is preferably used as memory means 1157.

Figure 16:
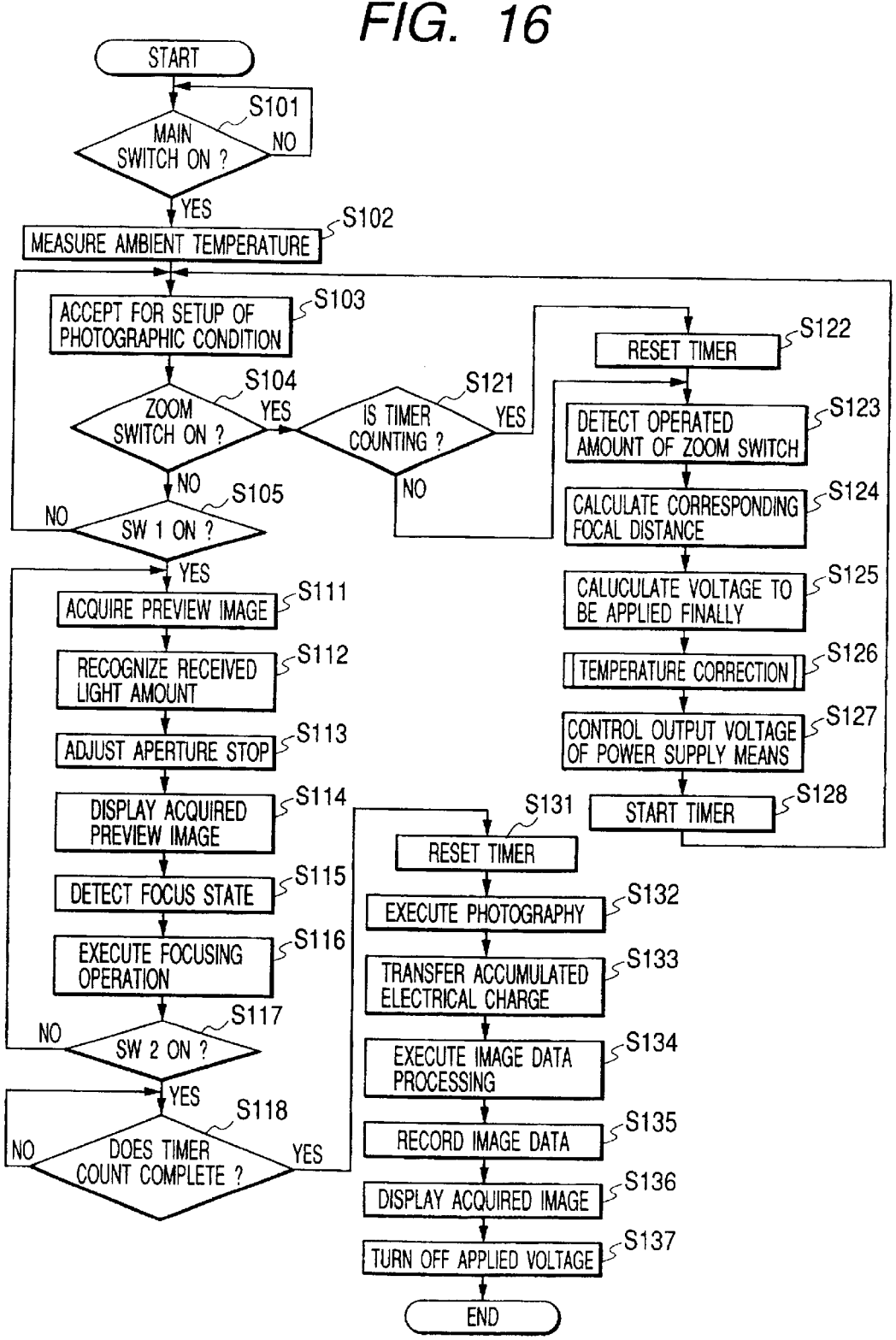
FIG. 16 is a flowchart of operation in the application of the optical device shown in FIG. 15.

FIG. 16 is a flowchart showing a control process performed by the CPU 1130 of the optical device 1150 shown in FIG. 15. The control process in the optical device 1150 will be described with reference to FIGS. 15 and 16.

In step S101, a determination is made as to whether the main switch 1152 has been operated. If the main switch 1152 has not been operated, the control is maintained in the wait mode of awaiting an operation of some of the various switches. If it is determined in step S101 that the main switch 1152 has been turned on, the wait mode is cancelled and the process advances to the next step S102 and other subsequent steps.

In step S102, the temperature of the environment in which the optical device 1150 is placed, i.e., the atmospheric temperature of the air surrounding the optical device 1150, is measured with the temperature sensor 1146.

In step S103, inputs entered by the photographer to set photographic conditions are accepted. For example, the photographer sets an exposure control mode (e.g., a shutter priority AE or programmed AE mode), an image quality mode (e.g., a mode for changing the number of recorded pixels or the image compression rate), a flash mode (e.g., a fill-flash or flash-off mode), etc.

In step S104, a determination is made as to whether the zoom switch 1153 has been operated by the photographer. If the zoom switch 1153 has not been turned on, the process advances to step S105. If the zoom switch 1153 has been operated, the process moves to step S121.

In step S121, a determination is made as to whether the timer 1147 is counting. If the timer 1147 is not counting, the process moves to step S123. If the timer 1147 is counting, the count value is reset (S122) and the process advances to step S123.

Figure 17:
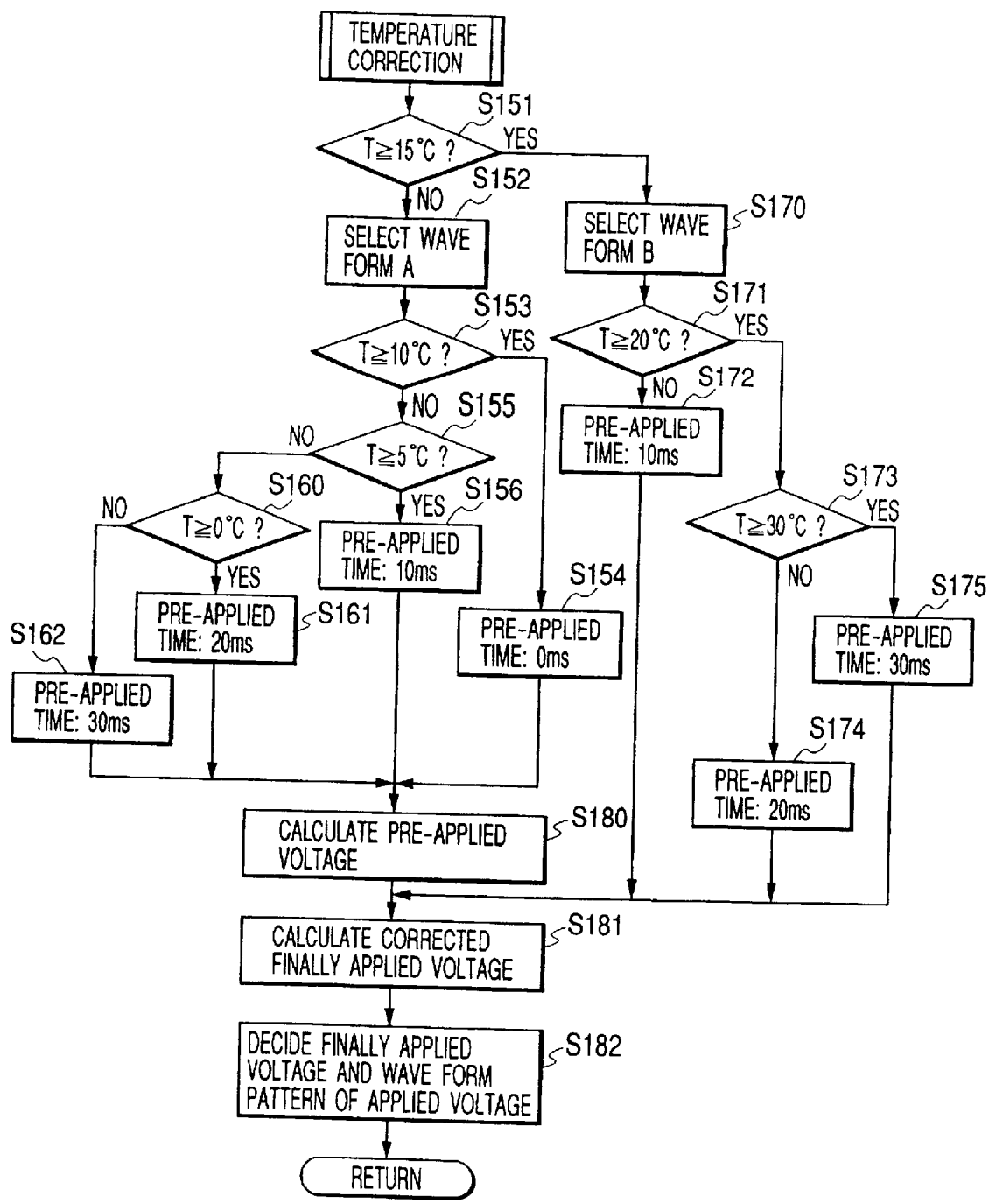
FIG. 17 is another flowchart of operation in the application of the optical device shown in FIG. 15.

In step S123, an amount by which the zoom switch 1153 has been operated (the operating direction, the on-time, etc.) are detected and the amount by which the focal length is to be changed according to the detected amount is calculated (S124). The value of a voltage $V_0$ to be finally applied to the optical element 101 is determined from the result of this calculation (S125). The process then proceeds to a "temperature correction" subroutine for correcting the finally-applied voltage and for determining an applied voltage waveform based on the temperature. (This subroutine is shown in FIG. 17 and will be described below in detail.) The power supply means 1131 is controlled by using the voltage to be finally applied to the optical element 101 and the applied voltage waveform pattern which are determined in the "temperature correction" subroutine, thereby applying a voltage to the optical element 101 (S127). Simultaneously, the timer 1147 is started to count (S128). The process then returns to step S103. That is, while the operation of the zoom switch 1153 is being continued, the steps S103 to S128 are repeatedly executed. When the operation of the zoom switch 1153 is finished, the process advances to step S105.

In step S105, a determination is made as to whether the photography preparation switch (represented by SW1 in the flowchart shown in FIG. 16) in the operation switch group 1154 has been operated by the photographer. If the switch has not been operated, the process returns to step S103 and acceptance of inputs for setting of photographic conditions and determination as to the operation of the zoom switch 1153 are repeated. If it is determined in step S105 that the photography preparation switch has been operated, the process advances to step S111.

In step S111, the image pick-up means 1144 and the signal processing circuit 1145 are driven to obtain a preview image, which is an image obtained before photographing of the desired image or a final recording image to enable the photographer to confirm his or her composition of photography and to appropriately set photographic conditions for the final recording image.

In step S112, the level of received light of the preview image obtained in step S111 is recognized. More specifically, the maximum, minimum and average output signal levels in the image signal output from the image pick-up means 1144 are calculated to recognize the amount of light incident upon the image pick-up means 1144.

In step S113, the diaphragm unit 1143 provided in the imaging optical system 1140 is driven on the basis of the amount of received light recognized in step S112 to adjust the aperture of the diaphragm unit 1143 so as to set the appropriate light amount.

In step S114, the preview image obtained in step Sill is displayed on the display 1151. In step S115, the state of focusing of the imaging optical system 1140 is detected by using the focus detection means 1154. In step S116, the first lens group 1141 is moved along the optical axis by the focus drive means 1155 to perform focusing. Thereafter, in step S117, a determination is made as to whether the photo-taking switch (represented by SW2 in the flowchart shown in FIG. 16) has been turned on. If the switch has not been turned on, the process returns to step Sill and the steps from obtaining a preview image to performing focus driving are repeated.

When the photographer turns on the photo-taking switch in the course of execution of the photography preparation steps repeatedly performed as described above, a determination is made as to whether counting by the timer 1147 has been completed (S118). If counting has not been completed, determination is continued. When counting by the timer 1147 is completed, the process jumps from step S118 to step S131 and the count value of the timer 1147 is reset (S131). The process then advances to step S132.

In step S132, an image is taken. That is, the subject image imaged on the image pick-up means 1144 is converted by photoelectric conversion to accumulate charges proportional to the intensities of portions of the optical image onto the charge accumulating portions in the vicinity of light receiving portions. In step S133, the charges accumulated in step S132 are read out via charge transport lines, and an analog signal obtained by this reading is input to the signal processing circuit 1145. In step S134, the input analog signal undergoes A/D conversion and processing for AGC control, white balance, γ-correction, edge enhancement, etc., in the signal processing circuit 1145. Also, the signal further undergoes JPEG compression or the like based on an image compression program stored in the CPU 1130 if necessary. In step S1135, the image signal obtained in step S134 is recorded in the memory 1157. Simultaneously, in step S136, the preview image is erased and the image based on the image signal obtained in step S134 is displayed on the display 1151. Thereafter, the power supply means 1131 is controlled to stop applying the voltage to the optical element 101 (S137), thereby terminating the sequence of photography steps.

The optical element 101 shown in FIG. 13 is of the same construction as the optical element 101 shown in FIG. 1. However, the optical element 101 shown in FIG. 13 differs from that shown in FIG. 1 in that colorless transparent silicone oil having a specific gravity of 1.06 and having a refractive index of 1.49 at room temperature is used as the second liquid 122 contained in the liquid chamber, and that an electrolyte having a specific gravity of 1.06 and a refractive index of 1.38 at room temperature and prepared by mixing water and ethyl alcohol in predetermined proportions and by adding a predetermined amount of sodium chloride to the mixture of water and ethyl alcohol is used as the first liquid 121.

The optical element 101 is constructed as described above and is therefore capable of freely changing the shape of the boundary between the first and second liquids according to the applied voltage, and the first and second liquids have different refractive indices. The optical element 101 therefore has a lens power and is formed as a variable-focus lens. Consequently, the focal length of the optical element 101 can be changed according to the zoom operation in step S125 shown in FIG. 16.

Processing in step S126 will next be described with reference to FIG. 17.

In step S151, a determination is made as to whether the atmospheric temperature measured with the temperature sensor 1146 is equal to or higher than 15° C. If the atmospheric temperature is lower than 15° C., an applied voltage waveform A shown in FIG. 18A is selected (S152). This is because when the temperature is low, the viscosity of each of the liquids 121 and 122 in the optical element 101 is so high that the time required to completely change the shape of the boundary is considerably long. A voltage higher than the predetermined finally-applied voltage reference value $V_0$ is applied at a rise stage after power-on to increase the rate of change in the shape of the boundary on startup, thereby reducing the time required to completely change the shape of the boundary.

The applied voltage waveform A is a waveform pattern for applying to the optical element 101 a second voltage, i.e., a pre-voltage $V_1$, higher than the finally-applied voltage reference value $V_0$ for a predetermined time (hereinafter referred to as "pre-applied time") before application of a first voltage corresponding to the finally-applied voltage reference value $V_0$ to the optical element 101, and for applying the first voltage corresponding to the finally-applied voltage reference value $V_0$ after the passage of the pre-applied time.

When the measured atmospheric temperature is equal to or higher than 10° C. and lower than 15° C. (S153), the pre-applied time is set to 0 ms (S154) and the process advances to step S180 of calculating the pre-voltage value $V_1$.

When the measured atmospheric temperature is equal to or higher than 5° C. and lower than 10° C. (S155), the pre-applied time is set to 10 ms (S156) and the process advances to step S180 of calculating the pre-voltage value $V_1$.

When the measured atmospheric temperature is equal to or higher than 0° C. and lower than 5° C. (S160), the pre-applied time is set to 20 ms (S161) and the process advances to step S180 of calculating the pre-voltage value $V_1$.

When the measured atmospheric temperature is lower than 0° C. (S160), the pre-applied time is set to 30 ms (S162) and the process advances to step S180 of calculating the pre-voltage value $V_1$.

The pre-voltage value $V_1$ is calculated in step S180 by, for example, the following equation:

Pre-voltage $V_1$=(Correction Constant 1)×(Reference Temperature−Measured Temperature)  Equation (1-1)

That is, the pre-voltage value $V_1$ is obtained by multiplying the difference from the reference temperature, i.e., 15° C., by the (correction constant 1).

After calculation of the pre-voltage value $V_1$, the process advances to step S181 and an amount of correction of the finally-applied voltage value $V_0$ is calculated and a finally-applied voltage application time is also obtained. The finally-applied voltage reference value $V_0$, obtained in step S125, is corrected by, for example, the following equation:

Corrected Finally-applied Voltage Value $V_0'$=(Finally-applied Voltage Reference Value $V_0$)+(Correction Constant 2)×(Reference Temperature−Measured Temperature)  Equation (1-2)

That is, the corrected finally-applied voltage value $V_0'$ is obtained as the sum of the finally-applied voltage reference value $V_0$ obtained in step S125 and the value obtained by multiplying the difference from the reference temperature of 15° C. by the (correction constant 2).

Figure 18B:
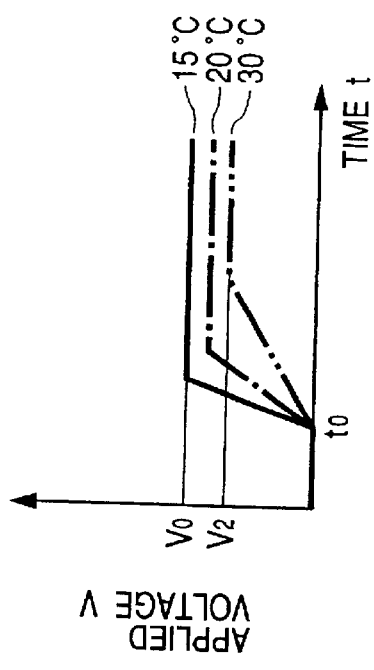
FIGS. 18A, 18B, 18C and 18D are diagrams showing the temperature correction operation of the variable-focus lens of the present invention.
Figure 18A:
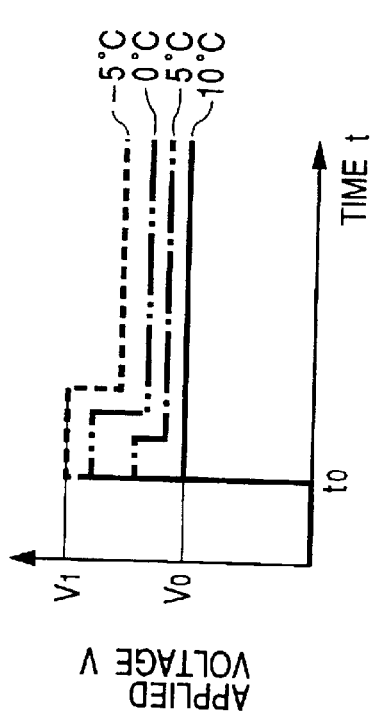
Figure 18D:
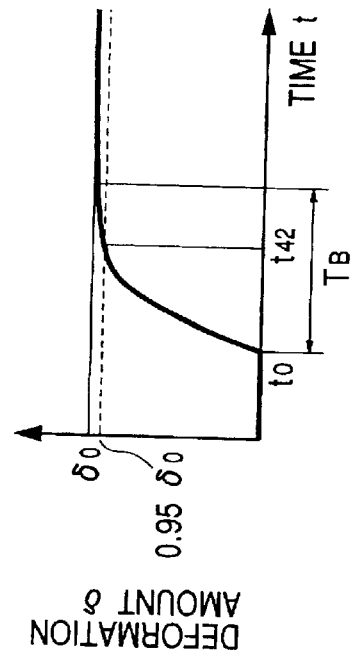
Figure 18C:
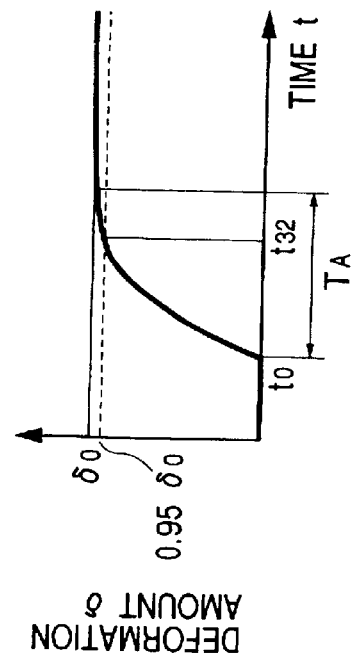

The above-described control finely changes the applied voltage waveform according to the temperature as shown in FIG. 18A, so that the boundary response waveform is generally constant regardless of the temperature and changing of the shape of the boundary is regarded as nearly completed at a time $t_{32}$, as shown in FIG. 18C. Then, the wait time of the timer 1147, used as a guide for recognition of the completion of changing of the boundary shape, is set to $T_A$ slightly longer than $t_{32}$, and this value is stored in the memory of the CPU 1130 in advance. In step S118 shown in FIG. 16, the value $T_A$ is referred to for the completion of the timer operation after saturation of change of the boundary to allow the step S131 and the other subsequent steps to be executed.

On the other hand, if it is recognized in step S151 that the measured temperature is equal to or higher than 15° C., an applied voltage waveform B shown in FIG. 17 is selected (S170). This is because when the temperature is high, the viscosity of each of the liquids 121 and 122 in the optical element 101 is so low that the a boundary vibration phenomenon occurs before the completion of changing of the shape of the boundary. To limit vibration of the boundary on startup, the applied voltage is gradually increased to the predetermined finally-applied voltage reference value $V_0$ at a rise stage after power-on.

The applied voltage waveform B is a waveform pattern for performing voltage control such that the applied voltage is gradually increased to the predetermined finally-applied voltage reference value $V_0$ during a predetermined time period (also referred to as "pre-applied time") before application of the voltage corresponding to the finally-applied voltage reference value $V_0$ to the optical element 101.

When the measured atmospheric temperature is equal to or higher than 15° C. and lower than 20° C. (S171), the pre-applied time is set to 10 ms (S172) and the process advances to step S181 of calculating a corrected finally-applied voltage value $V_0'$ and also obtaining a final voltage application time.

When the measured atmospheric temperature is equal to or higher than 20° C. and lower than 30° C. (S173), the pre-applied time is set to 20 ms (S174) and the process advances to step S181 of calculating a corrected finally-applied voltage value $V_0'$ and also obtaining a final voltage application time.

When the measured atmospheric temperature is equal to or higher than 30° C. (S173), the pre-applied time is set to 30 ms (S175) and the process advances to step S181 of calculating a corrected finally-applied voltage value $V_0'$ and also obtaining a final voltage application time.

The above-described control finely changes the applied voltage waveform according to the temperature as shown in FIG. 18B, so that the boundary response waveform is generally constant regardless of the temperature and changing of the shape of the boundary is regarded as completed at a time $t_{42}$, as shown in FIG. 18D. Then, the wait time of the timer 1147, used as a guide for recognition of the completion of changing of the boundary shape, is set to $T_B$ slightly longer than $t_{42}$, and this value is stored in the memory of the CPU 1130 in advance. In step S118 shown in FIG. 16, the value $T_B$ is referred to for the completion of the timer operation after saturation of changing of the boundary to allow the step S131 and the other subsequent steps to be executed.

Thus, the finally-applied voltage value and the applied voltage waveform pattern according to the temperature are determined (step S182). The process then returns to step S127.

The finally-applied voltage value and the applied voltage waveform pattern are controlled according to the temperature, thereby optimizing drive control with respect to each of a plurality of temperature levels.

According to this embodiment,
(1) an optical device can be obtained in which a voltage finally applied to an optical element and an applied voltage waveform pattern can be selected and controlled in accordance with temperatures to reduce the time required to change the shape of the optical element,
(2) a reduction in the time required to drive the optical element was actually achieved to reduce the power consumption of the optical device, and
(3) since exposure is inhibited before the completion of saturation of changing after changing the shape of the optical element, there is no considerable influence on the photo-taking operation of the optical device.

While in this embodiment the reference temperature at which an applied voltage waveform pattern is changed is set to 15° C. and a pre-applied time is set with respect to each of predetermined temperatures, a reference temperature and a pre-applied temperature may be selected according to the structure of the optical element, the kinds of liquids in the optical element, a combination of liquids, etc., to achieve similar effects.

While two-step voltage application to the optical element is performed in this embodiment, the number of voltage application steps may be increased to achieve similar effects.

In this embodiment, amounts of correction of a finally-applied voltage value and an applied voltage waveform pattern in accordance with temperatures are obtained by calculation. Alternatively, a table, such as that shown in FIG. 19, in which a voltage can be determined from a selected focal length and a temperature may be stored in the CPU and may be used to determine the above-mentioned correction amounts.

For explanation of this embodiment, a digital still camera has been described by way of example as an optical device in accordance with the present invention. Needless to say, the present invention can be also be applied advantageously to other kinds of optical devices, such as video cameras and silver-salt cameras The principle of the construction of another optical element in fourth embodiment of the present invention will be described with reference to FIGS. 20A and 20B.

Referring to FIGS. 20A and 20B, a container 7 is made of an insulating material, contains liquids described below, and is transparent in the horizontal direction as viewed in FIGS. 20A and 20B (in the direction along which light incident on the optical element travels through the same to exit), as is the corresponding case described above with reference to FIG. 13.

A second liquid 8 is contained in the container 7. The second liquid 8 is constructed by transparent silicone oil in this embodiment. A first liquid 9 is also contained in the container 7. The first liquid 9 is a transparent liquid having a refractive index smaller than that of the second liquid 8 and constituted by an aqueous electrolyte in which sodium chloride is dissolved.

An electrode 10 for applying to the electrolyte 9 a potential supplied from the outside is connected to a control circuit (not shown). An alternating current electric field at about ±200 V is applied to the electrolyte 9 through the electrode 10, as that described above.

A second electrode 11 in the shape of a ring is embedded in the insulating member forming the container 7, and is also connected to the control circuit (not shown). An alternating current electric field at about ±200 V is applied to the electrolyte 9 through the second electrode 11 in a phase of reversed polarity to that applied through the electrode 10, as is that described above.

A bundle of rays 12 incident upon the optical element in the state shown in FIG. 20A is converged by being refracted at the boundary between the second liquid 8 and the first liquid 9 because of the difference between the refractive indices of the liquids when it enters the first liquid 9 from the second liquid 8. In the state shown in FIG. 20B where an alternating current electric field is applied, the electrolyte, i.e., first liquid 9, pushes away the silicone oil or the like, i.e., second liquid 8, in the vicinity of the ring-shaped electrode 11, so that the convexity of the boundary between the two liquids is increased to improve the convergence of ejected rays 13. That is, the optical element shown in FIG. 20A is changed into a lens having a shorter focal length.

In the thus-constructed optical element, a shorter focal length is set, as shown in FIG. 20B, when the control circuit (not shown) starts ac energizing through the electrodes 10 and 11 from the non-energized state shown in FIG. 20A as described above to regulate focusing of a camera or change the power. This change relates to the voltage applied between the electrodes 10 and 11. Therefore the focal length can be arbitrarily selected.

In this embodiment, the above-described optical element is used to regulate focusing or power change. For example, the optical element may be formed as a lens 101, such as shown in FIG. 10, to constitute an optical system reduced in size and improved in performance.

Figure 21C:
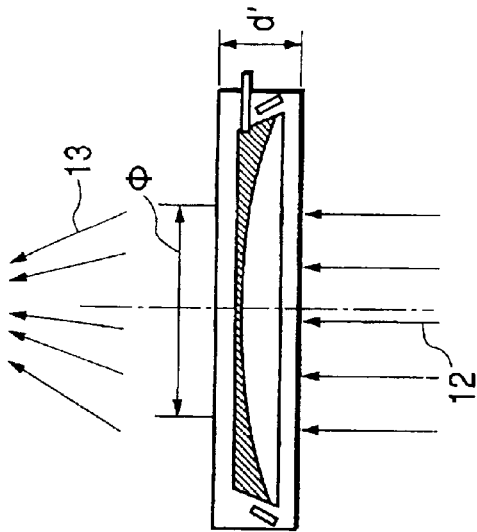
FIGS. 21A, 21B and 21C are diagrams showing another construction of the optical element in fourth embodiment of the present invention.
Figure 21B:
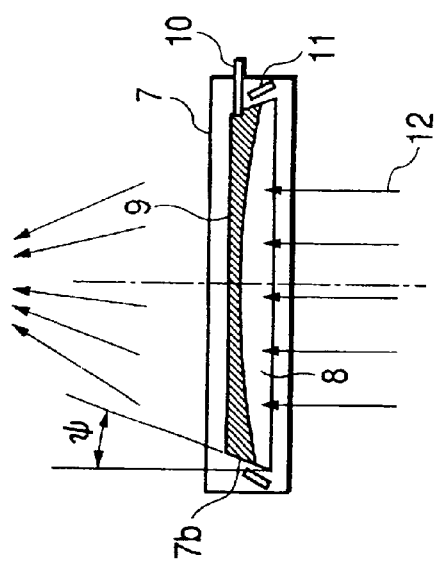

FIGS. 21B and 21C show the construction of another optical element in fourth embodiment of the present invention. In contrast with the optical element based on the principle shown in FIGS. 20A and 20B and with a similar one illustrated in FIG. 21A, this optical element is designed so that liquids can be contained in a container in a state of being reduced in thickness in the direction along the optical axis of the liquid, so that the overall size of the optical element can be further reduced.

Figure 21A:
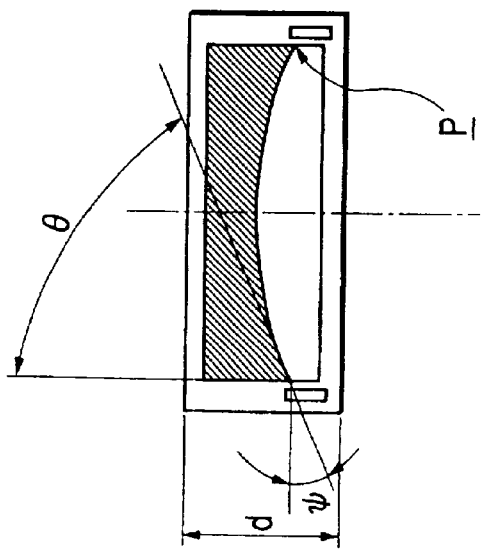

FIG. 21A shows a basic arrangement similar to that shown in FIGS. 20A and 20B. The state of the boundary between the first and second liquids will be discussed by paying attention to a point P at which the inner side surface of the container and the first and second liquids meet each other. An interfacial condition is formed on a line having an angle $\psi$ from a horizontal line as viewed in FIG. 21A and tangent to the boundary surface between the two liquids. Energizing through electrodes 10 and 11 from this state causes a change in the interfacial condition such that the angle $\psi$ is increased ($\theta$ is a contact angle and the relationship between $\theta$ and $\psi$ is $\psi=90°-\theta$).

It can be understood that the thickness d of the above-described unit can be made smaller (the unit can be made thinner) if the unit is constructed so that the angle $\psi$ is close to zero.

Figure 22:
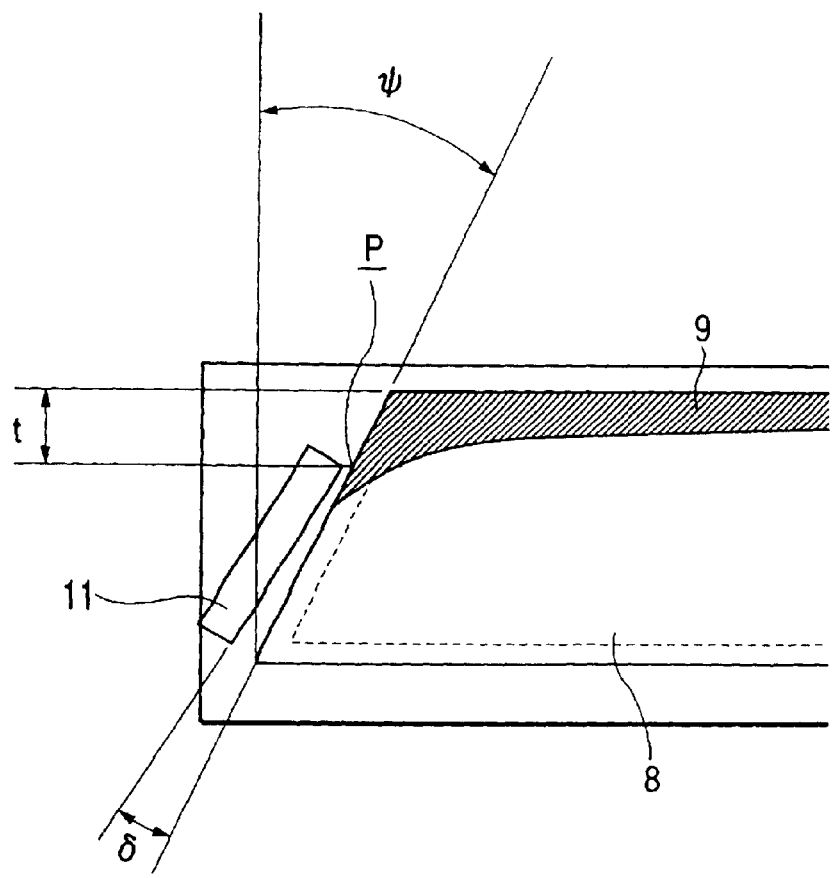
FIG. 22 is an enlarged diagram of a portion about a point P in FIG. 21B.

Therefore, the side surface of the container may be formed by being slanted at an angle $\psi$, as indicated at 7b in FIG. 21B, to form a thinner unit, as shown in FIG. 21B. FIG. 22 is an enlarged diagram of a portion of FIG. 21B or 21C about the point P. In FIG. 22, t designates the thickness of the layer of the aqueous solution. The range of t=0.1 to 0.5 mm is preferred as a condition for making the optical element satisfactory in terms of both light shielding effect and compactness.

The angle $\psi$ relates to the contact angle between the side surface of the container and the boundary surface between the two liquids, as shown in FIG. 21A, and is set so that the boundary surface of the two liquid has a large radius of curvature R, as shown in FIG. 21B. The ring-shaped electrode 11 is formed so as to be inclined by a small angle $\delta$ from the inner side surface of the container, and so that the distance between the electrode 11 and the inner side surface of the containing is minimized, for example, it is set to about 10 to 30$\mu$. The inner surface of the container indicated by the broken line in FIG. 9 is treated in advance by a well-known method to have such a property as to repel aqueous solution 9.

In the thus-constructed optical element, energizing from the amplifiers 1134 and 1135 shown in FIG. 13 causes a change in the shape of the boundary between the two liquids, as shown in FIG. 21C. Thus, the optical element can function as a focusing regulation device capable of refracting light from the incidence side and allowing the light to pass therethrough and exit from the emergence side. The convexity in this state, i.e., the focal length or the lens power is generally proportional to the voltage from the amplifiers 1134 and 1135, as mentioned above.

(Fifth Embodiment)

Figures 23A, 23B:
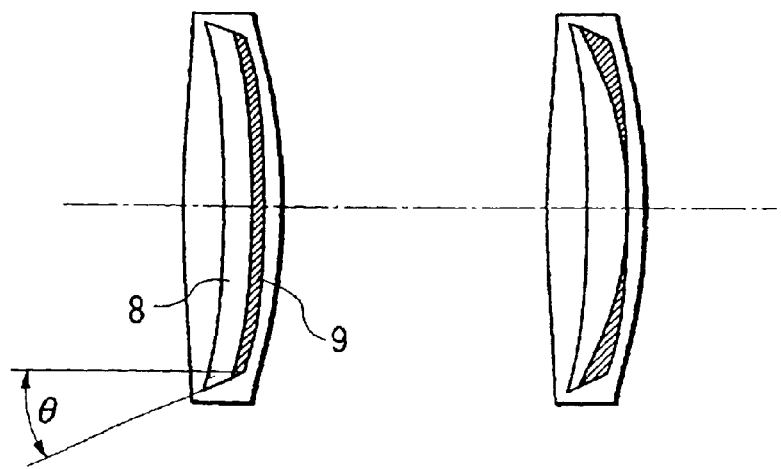
FIGS. 23A and 23B are diagrams showing the construction of a variable-focus lens in fifth embodiment of the present invention.

FIGS. 23A and 23B show the construction of a variable-focus lens in fifth embodiment of the present invention. In this embodiment, a variable-focus lens constructed on the basis of the basic structure of fourth embodiment is incorporated in a lens element.

FIG. 23A shows a non-energized state where the boundary between the two liquids does not substantially influences light transmitted through the variable-focus lens, and FIG. 23B shows a state where an electric field is applied in the above-described manner to change the boundary between the two liquids from the state shown in FIG. 23A, and the focal length of the lens shown in FIG. 23A is thereby changed.

In the state shown in FIG. 23B, the radius R of the boundary between the second liquid 8 having a higher refractive index and the first liquid 9 having a smaller refractive index is reduced relative to that in the state where, as in the above-described example, voltage is not applied, that is, the focal length of the lens as a whole shown in the figure is further reduced and the power is increased, thus achieving a focusing regulation function.

What is claimed is:

1. An optical device comprising:

an optical element having a container and first and second liquids contained sealingly in said container, said first and second liquids being substantially equal in refractive index, said first and second liquids existing without mixing with each other, said first and second liquids differing from each other in transmittance, said first and second liquids making the boundary between said first and second liquids having a predetermined shape; and an electrode formed in such a place as to avoid interference with passage of a bundle of rays incident upon said optical element, said electrode being ring-shaped to surround at least one of said first and second liquids, wherein an angle $\psi$ is set so that a curvature radius of the boundary between the first and second liquids becomes large, where said angle $\psi=90°-\theta$, with $\theta$ being a contact angle between a side surface of the container and the boundary between said first and second liquids.

2. An optical device comprising:

an optical element having a container and first and second liquids contained sealingly in said container, said first and second liquids being substantially equal in refractive index, said first and second liquids existing without mixing with each other, said first and second liquids differing from each other in transmittance, said first and second liquids making the boundary between said first and second liquids having a predetermined shape;

an electrode formed in such a place as to avoid interference with passage of a bundle of rays incident upon said optical element, said electrode being ring-shaped to surround at least one of said first and second liquids; and a voltage application circuit for applying a voltage to said electrode, wherein the shape of the boundary between said two liquids is changed by application of a voltage through said electrode to change the quantity of transmitted light in the bundle of rays passing through said optical element, and wherein an angle $\psi$ is set so that a curvature radius of the boundary between the first and second liquids becomes large, where said angle ψ=90°−θ, with θ being a contact angle between a side surface of the container and the boundary between said first and second liquids.

3. An optical device according to claim 1, wherein said electrode comprises a first electrode and a second electrode insulated from said first liquid, said first electrode being formed so as to be in communication with said first liquid through a side portion of said container, said second electrode being formed in a side portion of said container.

4. An optical device according to claim 2, wherein said electrode comprises a first electrode and a second electrode insulated from said first liquid, said first electrode being formed so as to be in communication with said first liquid through a side portion of said container, said second electrode being formed in a side portion of said container.

5. An optical device according to claim 1, wherein a side surface of said container has a plane inclined at a predetermined angle from the optical axis of the bundle of rays incident upon said optical element, and said first and second liquids are contained in said container in such a state that the boundary between said first and second liquids has a substantially flat shape.

6. An optical device according to claim 5, wherein the thickness of said first liquid along the optical axis in a non-energized state is within the range of 0.1 to 0.5 mm.

7. An optical device according to claim 5, wherein said electrode is provided along the side surface of said container inclined at the predetermined angle.

8. An optical device according to claim 1, wherein the optical path length of said first liquid along an optical axis and the optical path length of said second liquid along the optical axis change according to a voltage applied to said electrode.

9. An optical device according to claim 1, wherein the optical transmittance of said first liquid per unit optical path length is lower than the optical transmittance of said second liquid per unit optical path length, and the optical path length of said first liquid along the optical axis increases in accordance with the distance from the optical axis.

10. An optical device according to claim 1, wherein the optical transmittance of said first liquid per unit optical path length is lower than the optical transmittance of said second liquid per unit optical path length, and the optical path length of said first liquid along the optical axis changes between zero and a finite length according to a voltage applied to said electrode.

11. An optical device according to claim 1, wherein the optical transmittance of said second liquid per unit optical path length is lower than the optical transmittance of said first liquid per unit optical path length, and the optical path length of said second liquid along the optical axis decreases in accordance with the distance from the optical axis.

12. An optical device according to claim 1, wherein an optical surface on one side corresponding to one of said liquids having a lower optical transmittance is formed as a curved surface.

13. An optical system in which an image is formed on an image formation plane through a lens element, said optical system comprising at least one of a diaphragm and a shutter incorporated in said lens element, wherein said at least one of the diaphragm and the shutter is formed by an optical element having a container and first and second liquids contained sealingly in said container, said first and second liquids being substantially equal in refractive index, said first and second liquids existing without mixing with each other, said first and second liquids differing from each other in transmittance, and said first and second liquids making the boundary between said first and second liquids having a predetermined shape, wherein an electrode is formed in said optical element in such a place as to avoid interference with passage of a bundle of rays incident upon said optical element, said electrode being ring-shaped to surround at least one of said first and second liquids, and wherein an angle ψ is set so that a curvature radius of the boundary between the first and second liquids becomes large, where said angle ψ=90°−θ, with θ being a contact angle between a side surface of the container and the boundary between said first and second liquids.

14. A photo-taking device comprising:

an imaging optical system for forming a subject image;

an optical element for changing the quantity of transmitted light in a bundle of rays passing through said imaging optical system;

image pick-up means for recording the subject image;

said optical element having a container and first and second liquids contained sealingly in said container, said first and second liquids being substantially equal in refractive index, said first and second liquids existing without mixing with each other, said first and second liquids differing from each other in transmittance, said first and second liquids making the boundary between said first and second liquids having a predetermined shape;

an electrode formed in such a place as to avoid interference with passage of a bundle of rays incident upon said optical element, said electrode being ring-shaped to surround at least one of said first and second liquids; and a voltage application circuit for applying a voltage to said electrode, wherein the shape of the boundary between said two liquids is changed by application of a voltage through said electrode to change the quantity of transmitted light in the bundle of rays passing through said optical element, and wherein an angle ψ is set so that a curvature radius of the boundary between the first and second liquids becomes large, where said angle ψ=90°−θ, with θ being a contact angle between a side surface of the container and the boundary between said first and second liquids.

15. An optical device comprising:

an optical element having a container having a side surface inclined at a predetermined angle from an optical axis, and first and second liquids contained sealingly in said container, said first and second liquids differing substantially from each other in transmittance, said first and second liquids existing without mixing with each other, said first and second liquids making the boundary between said first and second liquids having a rounded shape; and an electrode formed in such a place as to avoid interference with passage of a bundle of rays incident upon said optical element, said electrode being ring-shaped to surround at least one of said first and second liquids, wherein an angle ψ is set so that a curvature radius of the boundary between the first and second liquids becomes large, where said angle ψ=90°−θ, with θ being a contact angle between the side surface of the container and the boundary between said first and second liquids.

16. An optical device comprising:
an optical element having a container having a side surface inclined at a predetermined angle from an optical axis, and first and second liquids contained sealingly in said container, said first and second liquids differing substantially from each other in transmittance, said first and second liquids existing without mixing with each other, said first and second liquids making the boundary between said first and second liquids having a rounded shape;
an electrode formed in such a place as to avoid interference with passage of a bundle of rays incident upon said optical element, said electrode being ring-shaped to surround at least one of said first and second liquids; and
an application circuit for applying a voltage to said electrode,
wherein the shape of the boundary is changed by application of a voltage to change the refractive power with respect to light passing through said optical element, and
wherein an angle $\psi$ is set so that a curvature radius of the boundary between the first and second liquids becomes large, where said angle $\psi=90°-\theta$, with $\theta$ being a contact angle between the side surface of the container and the boundary between said first and second liquids.

17. An optical device according to claim 15, wherein said electrode comprises a first electrode and a second electrode insulated from said first liquid, said first electrode being formed so as to be in communication with said first liquid through a side portion of said container, said second electrode being formed in a side portion of said container.

18. An optical device according to claim 16, wherein said electrode comprises a first electrode and a second electrode insulated from said first liquid, said first electrode being formed so as to be in communication with said first liquid through a side portion of said container, said second electrode being formed in a side portion of said container.

19. An optical device according to claim 17, wherein said electrode comprises a ring-shaped electrode formed so as to surround said second liquid.

20. An optical device according to claim 15, wherein the optical path length of said first liquid along the optical axis and the optical path length of said second liquid along the optical axis change according to a voltage applied to said electrode.

21. An optical device according to claim 15, wherein the refractive index of said first liquid is smaller than the refractive index of said second liquid, and the optical path length of said first liquid along the optical axis increases in accordance with the distance from the optical axis.

22. An optical device according to claim 15, wherein the refractive index of said first liquid is smaller than the refractive index of said second liquid, and the optical path length of said first liquid along the optical axis changes within the range of finite lengths according to a voltage applied to said electrode.

23. An optical device according to claim 15, wherein an optical surface of said container containing said liquids is formed as a curved surface.

24. An optical system in which a predetermined image is formed or light of the image is converged by a lens element, said optical system comprising:
an optical element constituting a portion of said optical system, said optical element including a container having a side surface inclined at a predetermined angle from an optical axis, and first and second liquids contained sealingly in said container, said first and second liquids differing substantially from each other in refractive index, said first and second liquids existing without mixing with each other, said first and second liquids making the boundary between said first and second liquids having a rounded shape; and
an electrode formed in such a place as to avoid interference with passage of a bundle of rays incident upon said optical element, said electrode being ring-shaped to surround at least one of said first and second liquids,
wherein an angle $\psi$ is set so that a curvature radius of the boundary between the first and second liquids becomes large, where said angle $\psi=90°-\theta$, with $\theta$ being a contact angle between the side surface of the container and the boundary between said first and second liquids.

25. A photo-taking device comprising:
an imaging optical system for forming a subject image:
a variable-power optical element incorporated in said imaging optical system, said variable-power optical element including a container having a side surface inclined at a predetermined angle from an optical axis, and first and second liquids contained sealingly in said container, said first and second liquids differing substantially from each other in refractive index, said first and second liquids existing without mixing with each other, said first and second liquids making the boundary between said first and second liquids having a rounded shape;
an electrode formed in such a place as to avoid interference with passage of a bundle of rays incident upon said optical element, said electrode being ring-shaped to surround at least one of said first and second liquids; and
image pick-up means for recording the subject image,
wherein an angle $\psi$ is set so that a curvature radius of the boundary between the first and second liquids becomes large, where said angle $\psi=90°-\theta$, with $\theta$ being a contact angle between the side surface of the container and the boundary between said first and second liquids.

* * * * *

UNITED STATES PATENT AND TRADEMARK OFFICE
CERTIFICATE OF CORRECTION

PATENT NO. : 6,702,483 B2
DATED : March 9, 2004
INVENTOR(S) : Takayuki Tsuboi et al.

It is certified that error appears in the above-identified patent and that said Letters Patent is hereby corrected as shown below:

<u>Title page,</u>
Item [56], References Cited, FOREIGN PATENT DOCUMENTS,
"JP 3-87816 9/2000" should read -- JP 3-87816 4/1991 --.

<u>Column 4,</u>
Line 5, "closely" should read -- close --.

<u>Column 7,</u>
Line 61, "an" should read -- a --.

<u>Column 9,</u>
Line 17, "determined" should read -- is determined --; and
Line 45, "a" should read -- an --.

<u>Column 11,</u>
Line 35, "field of depth" should read -- depth of field --.

<u>Column 12,</u>
Line 35, "30$\mu$." should read -- 30$\mu$m. --.

<u>Column 13,</u>
Line 25, "in" (second occurrence) should read be deleted.

<u>Column 14,</u>
Line 4, "as" should read -- so as --.

<u>Column 16,</u>
Line 7, "are" should read -- is --;
Line 54, "Sill" should read -- S111 --; and
Line 63, "Sill" should read -- S111 --.

<u>Column 19,</u>
Line 4, "a" should be deleted.

<u>Column 20,</u>
Line 25, "cameras" should read -- cameras. --.

UNITED STATES PATENT AND TRADEMARK OFFICE
CERTIFICATE OF CORRECTION

PATENT NO. : 6,702,483 B2
DATED : March 9, 2004
INVENTOR(S) : Takayuki Tsuboi et al.

It is certified that error appears in the above-identified patent and that said Letters Patent is hereby corrected as shown below:

Column 21,
Line 51, "liquid" should read -- liquids --;
Line 56, "containing" should read -- container --; and
Line 57, "30$\mu$." should read -- 30$\mu$m. --.

Column 22,
Line 10, "influences" should read -- influence --;
Line 39, "an angle $\Psi$ is set" should read -- a side surface of the container is inclined by an angle $\Psi$ --;
Line 42, "a" should read -- the --;
Line 43, "liquids." should read -- liquids when no voltage is applied via the electrode. --; and
Line 66, "an angle $\Psi$ is set" should read -- a side surface of the container is inclined by an angle $\Psi$ --.

Column 23,
Line 2, "a" should read -- the --;
Line 3, "liquids." should read -- liquids when no voltage is applied via the electrode. --;
Line 15, "a side" should be deleted;
Lines 16 and 17 should be deleted;
Line 18, "incident upon said optical element, and" should be deleted;
Line 25, "claim 5," should read -- claim 1, --;
Line 26, "side" should read -- inclined side --; and "container" should read -- container. --; and
Line 27 should be deleted.

Column 24,
Line 9, "an angle $\Psi$ is set" should read -- a side surface of the container is inclined by an angle $\Psi$ --;
Line 12, "a" should read -- the --;
Line 13, "liquids." should read -- liquids when no voltage is applied via the electrode. --;
Line 43, "an angle $\Psi$ is set" should read -- a side surface of the container is inclined by an angle $\Psi$ --;
Line 46, "a" should read -- the --;
Line 47, "liquids." should read -- liquids when no voltage is applied via the electrode. --;
Line 63, "an angle $\Psi$ is set" should read -- a side surface of the container is inclined by an angle $\Psi$ --;
Line 64, "becomes" should read -- becomes large --; and
Lines 65-67 should be deleted.

UNITED STATES PATENT AND TRADEMARK OFFICE
CERTIFICATE OF CORRECTION

PATENT NO. : 6,702,483 B2
DATED : March 9, 2004
INVENTOR(S) : Takayuki Tsuboi et al.

It is certified that error appears in the above-identified patent and that said Letters Patent is hereby corrected as shown below:

Column 25,
Line 23, "an angle $\Psi$ is set" should read -- the side surface of the container is inclined --;
Line 25, should read -- large. --;
Lines 26 and 27, should be deleted.

Column 26,
Line 24, "an angle $\Psi$ is set" should read -- the side surface of the container is inclined --;
Line 26, should read -- large. --;
Lines 27 and 28, should be deleted;
Line 30, "image:" should read -- image; --;
Line 48, "an angle $\Psi$ is set" should read -- the side surface of the container is inclined --;
Line 50, should read -- large. --; and
Lines 51-53, should be deleted.

Signed and Sealed this

Eleventh Day of January, 2005

JON W. DUDAS
*Director of the United States Patent and Trademark Office*